(12) United States Patent
Höglund et al.

(10) Patent No.: US 9,073,031 B2
(45) Date of Patent: Jul. 7, 2015

(54) FLOW MODULE

(75) Inventors: Kasper Höglund, Rönninge (SE);
Tommy Norén, Veberöd (SE); Barry Johnson, Milton Keynes (GB)

(73) Assignee: Alfa Laval Corporate AB, Lund (SE)

( * ) Notice: Subject to any disclaimer, the term of this patent is extended or adjusted under 35 U.S.C. 154(b) by 191 days.

(21) Appl. No.: 13/264,016

(22) PCT Filed: Apr. 13, 2010

(86) PCT No.: PCT/SE2010/050397
§ 371 (c)(1),
(2), (4) Date: Dec. 28, 2011

(87) PCT Pub. No.: WO2010/120234
PCT Pub. Date: Oct. 21, 2010

(65) Prior Publication Data
US 2012/0114527 A1    May 10, 2012

(30) Foreign Application Priority Data
Apr. 15, 2009    (SE) ...................................... 0950247

(51) Int. Cl.
*B01L 3/00* (2006.01)
*G01N 31/16* (2006.01)
(Continued)

(52) U.S. Cl.
CPC ........... *B01J 19/0093* (2013.01); *B01F 5/0604* (2013.01); *B01J 2219/00783* (2013.01); *B01J 2219/00873* (2013.01); *B01J 2219/00889* (2013.01); *B01J 2219/2453* (2013.01); *B01J 2219/2458* (2013.01); *B01J 2219/2462* (2013.01); *B01J 2219/2474* (2013.01); *B01J 2219/2485* (2013.01);
(Continued)

(58) Field of Classification Search
CPC ............................ B01F 5/0604; B01J 19/0093
USPC ......................................................... 422/603
See application file for complete search history.

(56) References Cited

U.S. PATENT DOCUMENTS

| | | | |
|---|---|---|---|
| 1,972,379 A | 9/1934 | Feldmeier | |
| 2,015,819 A | 10/1935 | Seligman et al. | |
| 2,221,937 A | 11/1940 | Astle | |

(Continued)

FOREIGN PATENT DOCUMENTS

| | | |
|---|---|---|
| CN | 1867795 A | 11/2006 |
| CN | 100430125 C | 11/2008 |

(Continued)

OTHER PUBLICATIONS

PCT International Search Report for corresponding Application No. PCT/SE2007/001042, date of completion Mar. 5, 2008.

(Continued)

*Primary Examiner* — Jill Warden
*Assistant Examiner* — Julie Tavares
(74) *Attorney, Agent, or Firm* — MKG, LLC

(57) ABSTRACT

The present invention relates to a channel plate comprising a number of rows of units, at least one inlet and at least one outlet, at least one turning box, wherein turning boxes being connections between two adjacent rows of units in the channel plate, that fluid may flow from one row to the other in the created room. The present invention relates further to flow sections and flow module.

22 Claims, 19 Drawing Sheets

(51) Int. Cl.
B01J 19/00 (2006.01)
B01F 5/06 (2006.01)

(52) U.S. Cl.
CPC .. *B01J 2219/2486* (2013.01); *B01J 2219/2488* (2013.01); *B01J 2219/249* (2013.01)

(56) References Cited

U.S. PATENT DOCUMENTS

| | | | |
|---|---|---|---|
| 2,405,256 | A | 8/1946 | Jack et al. |
| 2,582,871 | A | 1/1952 | Kintner |
| 2,677,531 | A | 5/1954 | Hock Sr. et al. |
| 4,584,751 | A | 4/1986 | Gray et al. |
| 4,776,387 | A | 10/1988 | Newman |
| 4,901,414 | A | 2/1990 | Breda et al. |
| 5,462,112 | A | 10/1995 | Johansson |
| 5,484,666 | A | 1/1996 | Gibb et al. |
| 6,557,427 | B2 | 5/2003 | Weigl et al. |
| 7,189,468 | B2 | 3/2007 | Izenson et al. |
| 8,161,997 | B2 | 4/2012 | Hoglund et al. |
| 2003/0116305 | A1 | 6/2003 | Beddome et al. |
| 2004/0188060 | A1 | 9/2004 | Finch et al. |
| 2004/0224213 | A1 | 11/2004 | Dristy |
| 2006/0159600 | A1* | 7/2006 | Chopard ............ 422/195 |
| 2008/0267845 | A1 | 10/2008 | Hoglund et al. |

FOREIGN PATENT DOCUMENTS

| | | |
|---|---|---|
| CN | 101300067 A | 11/2008 |
| EP | 0043113 A2 | 1/1982 |
| JP | 49-024026 B | 6/1974 |
| JP | 09-127527 A | 5/1997 |
| JP | 10138660 | 5/1998 |
| JP | 64000220 Y2 | 5/1998 |
| JP | 2001-276943 A | 10/2001 |
| JP | 2005-131763 A | 5/2005 |
| JP | 2008-036650 A | 2/2008 |
| SE | 0801181-9 | 11/2009 |
| SU | 561071 A1 | 6/1977 |
| SU | 1399633 A1 | 5/1988 |
| WO | 9510746 | 4/1995 |
| WO | 2004045761 A1 | 6/2004 |
| WO | 2005060393 A2 | 7/2005 |
| WO | 2007050013 A1 | 5/2007 |
| WO | WO 2007050013 A1 * | 5/2007 |
| WO | 2008066447 A1 | 11/2007 |
| WO | 2008076039 A1 | 6/2008 |
| WO | WO 2008066447 A1 * | 6/2008 |

OTHER PUBLICATIONS

Swedish International Search Report for corresponding Application No. PCT/SE2009/050485, date of completion Sep. 18, 2009.

Taiwan Office Action/Search Report for corresponding Taiwan Patent Application No. 098114950, date of completion May 10, 2013.

Notice of Inquiry from corresponding Japanese Application No. 2011-510460, dated Oct. 29, 2013.

* cited by examiner ably inserted in the reactor chamber R. A cavity 9 formed between the side wall 12 and the block of units 1, is provided to allow fluid flow unobstructed from one row of units to another row of units. The reactor chamber R and the block of units 1 are two separate pieces and therefore require assembly to function properly. In addition, since the fluid can flow from adjacent rows of units unobstructed through the chamber 9, the fluid can, in some situations, not mix properly.

SUMMARY

Thus, one object of the present invention is to provide a flexible concept of a continuous flow module, adaptive to desired processes such as chemical reactions, mixings, extractions etc.

Another object is to provide a continuous flow module, which has good accessibility and is easy to handle, etc.

A further object is to provide a continuous flow module having good heat transfer performance, and opportunity to control temperature.

A further object is to provide a continuous flow module having fluid flow characteristics suitable for chemical reactions, extractions, separations etc.

A further object is to provide a continuous flow module having improved pressure properties.

The present invention resides in one aspect in a flow module comprising channel plates and utility plates. The channel plate comprises a plate, at least one row of units within the plate, at least one inlet and at least one outlet, wherein each unit contains one planar surface opposite a channel forming surface, and that the units are alternating in the row of units that a planar surface is adjacent to a channel forming surface, in the same row, and that the channel plate constitutes one part and the rows of units are integrated in the plate, or the channel plate is divided in midplane and constitutes two parts corresponding to each other and put together form the channel of the channel plate, or the channel plate constitutes of a frame and two formed sheets or two pressed plates, which frame and two formed sheets or two pressed plates put together form the channel of the channel plate. The channel plate according to the present invention can also comprise at least one turning box, wherein the turning box being a space or a room between two adjacent rows of units in the channel plate and one inner side of the channel plate, which turning box enables communication between the two adjacent rows of units, such that fluids may flow from one row to the other in the space or the room of the turning box.

The present invention relates also to an alternative channel plate, which channel plate comprises at least two rows of units each unit having one planar surface opposite a channel forming surface, and that the units are alternating in each row that a planar surface is adjacent to a channel forming surface in the same row, at least one turning box, at least one inlet and at least one outlet, wherein the turning box being a space or a room between two adjacent rows of units in the channel plate and one inner side of the channel plate, which turning box enables communication between the two adjacent rows of units, such that fluids may flow from one row to the other in the space of the turning box. The channel plate according to the invention, could constitute one part and the rows of units are integrated in the plate, or the channel plate could be divided in midplane and constitutes two parts corresponding to each other and put together form the process channel of the channel plate, or the channel plate constitutes a frame and two formed sheets or two pressed plates, which frame and two formed sheets or two pressed plates put together form the process channel of the channel plate.

The channel plate according to the invention can also comprise a number of rows of units, a number of turning boxes. By using turning boxes it is possible to create a three dimensional flow to give an enhanced mixing and improved heat transfer between the utility plate and the channel plate. By the use of the channel plate high mixing rates can be created and a narrow distribution of the residence time is obtained.

The present invention relates further to a flow section, which flow section comprises a channel plate, barrier plates or utility plates or combinations of barrier plates and utility plates. The channel plate can be arranged between two barrier plates, which barrier plates seal a channel created by the channel plate and the two barrier plates. The flow section can also comprise a channel plate arranged between two utility plates having turbulator inserts, which utility plates seal a channel created by the channel plate and the two utility plates, or the flow section may comprise a channel plate arranged between one barrier plate and one utility plate which seal a channel created by the channel plate and the two plates. The flow section may also comprise two channel plates that have a membrane or have a filter applied between the two channel plates. The flow section can also include the two channel plates between two barrier plates, which are sealing channels created by the channel plates and the two barrier plates, or wherein the two channel plates are arranged between two utility plates having turbulator inserts, or combinations of barrier plates and utility plates.

The flow section can also comprise gaskets that seal the different plates from leakage. The gasket may be a flat sheet, or multi layer sheet of a suitable material, examples of such material may be multi layer expanded polytetrafluoroethylene (ePTFE), polytetrafluoroethylene (PTFE), perfluorelatomers, or fluorelastomers, polyetheretherketone (PEEK), polypropene (PP), etc. The material of the gasket may be a soft material such as soft PEEK, PP, PTFE etc. or Viton®, Teflon®, Kalrez® etc. However, the present invention is not limited in this regard.

The gaskets of the flow section can have a pattern corresponding to the planar surfaces of the units of the rows of units. The turbulator insert of the utility plates can have a pattern corresponding to the planar surfaces of the units of the rows of units, or both the gaskets and the turbulator insert of the utility plates can have patterns corresponding to the planar surfaces of the units of the rows of units. By this the flow of media or the flow of fluids in the created channel can have no contact with the gasket's planar faces and little or minimized contact with any of the gasket's edges, and each turbulator insert can provide a support to the planar sides of the row of units of the channel plate.

The present invention relates also to a flat-designed continuous flow module, for instance a plate reactor, comprising different plates or sections, wherein one or more channel plates are stacked together with utility plates, barrier plates, heat exchanger plates or one or more flow sections. The flow module may comprise a stack of flow sections, and the flow module can have at least one inlet for process fluids and at least one outlet for process products. One inlet could be connected to the first channel plate and one outlet could be connected to the last channel plate. The process channel could be connected parallel or the process channel could be connected in series, or both, the channel could be connected externally or the channel could be connected internally, preferably the channel is connected externally between different channel plates. One example of such arrangement could be that two channels of two channel plates are connected parallel to each other and the channels are combined in one channel of a third channel plate, which third channel plate is connected in series with the first two plates. Such an arrangement could be suitable for a two step reaction wherein the reactants are produced in the first two channel plates and a second reaction takes place in the third channel plate. Naturally any combinations of connections between channels could be designed for different reactions, for one step reactions or multi step reactions according to the present invention. Internal and/or external conduits connect the utility plates and the utility plates are connected in series or parallel or both to each other.

The flow module could also comprise a clamping device, which can be connected to the flow module, the clamping device comprises two end plates, disc springs, pistons, and tension rods, wherein piles of disc springs are thread on the pistons and are arranged as a grid of springs, one or more grids of springs are comprised in the flow module, at least one grid of springs is supported on one of the endplates to distribute clamping forces on one or more flow sections or one or more channel plates, which flow sections are placed between the two end plates, and wherein the pistons are guided through holes in the endplates having the arrangement of the grid of springs. The flow module can comprise hydraulic tools such as hydraulic cylinders or hydraulic actuators. The hydraulic tools can provide tools for opening and closing the flow module and/or they can provide pressure on the flow module plates to secure a tight sealing of the flow module.

The rows of units of the channel plate are adjacent to each other and each unit has a planar surface and a channel forming surface, the planar surface being generally opposite the channel forming surface. The channel forming surface according to the invention, could be selected from curved convex surface, trapezoid surface, rectangular surface, square surface, triangular surface, and the rows of units can have all channel forming surfaces selected from the same surface type or the channel forming surfaces of the rows of units could be one or more combinations of curved convex surfaces, rectangular surfaces, square surfaces, and triangular surfaces. The purpose of the shape of the channel in each channel plate is to enhance mixing or heat transfer performance in each of the channel plates. Thus, better matched total process requirements could be obtained, eg for each single reaction. The channel plates in a flow module may all be the same or all may be different depending on the process requirements.

The planar surface and the channel forming surface of the units are alternating in the rows enabling a flow of fluids or media to pass the units within the row when the channel plate is assembled in the flow section or between barrier plates. The planar surfaces of the units allow a barrier plate or a utility plate to be mounted with a gasket in such a way that the channel could be sealed and leakage can be avoided. The planar surfaces could be arranged either in rows or alternating. Preferably the planar surfaces are arranged in rows. When the planar surfaces are arranged in rows it is possible to support the rows of units with the turbulator insert of the utility plate, this enables that high pressure can be applied to the channel plate and that leakage can be avoided. The channel starts with an inlet and continuous through the units through out the channel plate, and the channel ends with an outlet in the last row of units. The process channel as well as the utility flow of the utility plates could be connected parallel or be connected in series, or both, between two or more flow sections. The connections between the flow sections could be external or internal. Preferably the channels of the channel plates are connected externally. Internal and/or external conduits are connecting the utility plates of the flow sections and the utility plates are connected in series or parallel or both to each other. The inlets and the outlets of the utility plates can have ports for thermo couples, resistance thermometers etc.

The channel plate can have a number of ports connected to the channel or the turning boxes within the plate. The ports could be arranged on one, or on two sides, or on three sides, or all sides of the channel plate. This means that the ports are arranged on at least one side of the channel plate. The ports are either plugged or equipped with different equipments or the ports are combinations of plugged and equipped ports, which equipment are introduced through the ports to the channel or to the empty space of the turning boxes, and can be arranged anywhere on the channel plate. The equipment which can be introduced through the ports to the channel or the turning boxes can be selected from the group consisting of inlets for reactants, inlets for additional fluids, outlets for process fluids, outlets for intermediate products to be fed into the channel at a later stage, outlets for test samples, injection nozzles, inlet dispersers, security devices for pressure release instant or controlled, sensor units, thermo couples, resistance thermometers. The ports can have means for injection of fluids, reactants etc. such as for example a nozzle that can introduce additional fluids, re-mixing fluids, re-dispersion fluids etc. at a chosen location of the channel. The location could be anywhere, which means that the introduction of fluids could be at an inlet on the channel plate, or anywhere on the channel plate, or on a second plate etc. in a flow module. A mix or a dispersion need sometime to be re-mixed or re-dispersed after some holding time or after a going through a channel plate, then it can be suitable to inject the mix or the dispersion again into the channel, this can be done between an outlet of one plate and an inlet of the next plate, and the injection can be done with any kind of suitable nozzle. The nozzles, which are inserted in the ports or the inlets, can be selected form any suitable nozzle and examples of nozzles are injection nozzles, dispersion nozzles, re-dispersion nozzles, re-mixing nozzles, coaxial nozzles, tube nozzles etc. A coaxial nozzle could be defined as a nozzle with two or more tubes arranged within each other, that a larger tube having a large radius is surrounding a smaller tube having a smaller radius. When such a nozzle is used two or more fluids can be mixed or form dispersions. A re-mixing nozzle could be a tube nozzle having a hole with a nozzle head and the hole has a smaller radius than the tube. The nozzle may be a dispersion nozzle which can have one or more holes at the outlet of the dispersion nozzle and the holes can be arranged in concentric circles or the holes can be arranged in other suitable patterns.

The channel plate can comprise a process flow inlet and a second inlet, which could be a dispersion flow inlet or an injection inlet, at the inlet part of the channel plate, wherein the process flow inlet and the second inlet could be combined could the channel form a straight part before the first unit in the first row of units. The straight part of the channel could also end at the first turning box. The second inlet may have means for injection of fluids, reactants etc. such as for example a nozzle that can introduce additional fluids. The nozzle can be selected from any suitable type of nozzles and could be inserted at the straight part which forms a dispersion zone for introducing or injecting materials or substances into a process fluid. The inlets of fluids may also be combined before being let into the channel of the channel plate. According to this alternative it is not necessary to have one inlet for process flow and another inlet for injection of fluids etc. Thus, with combined inlets outside the channel plate it is possible to only use the process flow inlet.

When producing fine dispersions in the flow by introducing a non-miscible liquid in a controlled manner and in a safe way at high velocity into the process flow in the channel, then it is crucial that the nozzle has the adequate design. The designed nozzle may be a disperser or an injector. The nozzle may be fitted to the second inlet port of the channel plate. One or more immiscible liquid phases could simultaneously be fed through the nozzle. The designed nozzle could be a disperser having a mouthpiece in the form of a closed tube with a single hole area in the closed end having a hole diameter (D), or where multiple n holes are present a diameter (D) corresponding to the ratio of the total area of the holes divided by the number of holes n of the nozzle, which is suitably larger than the the length or depth (T) of the hole in the nozzle. The ratio may be selected so that the length of the hole is much smaller than the diameter of the hole (T<<D). When the disperser is in use droplets will be sprayed out of the disperser and create a cone of droplets in the process flow. The size of the droplets that are created depends on the pressure difference at the very outlet of the nozzle and the pressure in the compartment. If the length of the hole (T) is large then it will be difficult to create the desired pressure condition at that point.

For small size nozzles length (T) and diameter (D) will be very small and manufacturing limitations can occur. A favorable way to make such a nozzle is for instance to use etching, laser piercing or micro-drilling on a thin plate which then is orbital welded by laser or by electron beam on to a tube. A nozzle can produce droplets and the droplet size will depend on the flow and the selected nozzle diameter. To increase flow through one nozzle it's possible to make a larger hole or to make more holes through the nozzle. By using many small holes instead of one big hole it is possible to create smaller droplets. To make sure to have the same pressure condition in each hole it is favourable to arrange the holes axisymmetrically relative to the main axis of the tube on which the nozzle is orbital welded. There may be several rows of holes located on concentrical circles. The hole size could be chosen according to the flow velocities for the radius of the concentrical circle or the viscosity of the fluids passing out of the holes. The spraying of materials out of the nozzle may be continuously, in a pulse-mode, or be sprayed in intervals specially adapted to the application or the process of the multipurpose flow module.

A pump may be connected for supplying and to pressurize the fluid to the nozzle. The fluid will be sprayed out of the nozzle in a cone shaped fashion. The pump could either continuously pump fluids to the nozzle or feed the nozzle in a pulse-mode. The pulses can for example be generated by control of the pump's work cycle or by a valve in the feed line to the nozzle. The pump is suitably controlled to maintain a given pressure level. If the nozzle is fed in pulse-mode then it could be important that the volume between nozzle and pulse valve does not change with pressure. The duty cycle (i.e., open time/period time) of the valve, i.e. the open time 99 is less or equal to 100% of the total period time and is≠0%, can be controlled to give a given flow rate, as shown in FIG. 27.

The nozzle can be operated under pulsed or un-pulsed modes, and is used for making fluids sprays at a given average flow rate. The nozzle size is selected to give a sufficient flow rate at the pressure available and the pressure level may be set to give a certain droplet size. This means that the droplet size could be adjusted by changing the pump pressure at a constant flow rate. The pump speed may be controlled to give a set flow rate through the open valve i.e. un-pulsed mode.

The planar surfaces of the channel plate are preferably arranged in parallel rows perpendicular to the channel, and the planar surfaces of the rows will support barrier plates or utility plates on both sides of the channel plate. The barrier plate may be a separate plate or integrated either with the channel plate or integrated with the utility plate. One or two heat exchanger plates could be connected to the channel plate and the heat exchanger plate could be a non-fluid heat transfer member, or a Peltier element.

The barrier plates could be brazed to the channel plate providing a sandwich type of arrangement, or may the channel plate be brazed to the utility plate according to another alternative. The barrier plates could be arranged by any suitable method to the channel plate or to the utility plate. As mentioned before the channel plate may have one or two barrier plates arranged on one or on both flat sides of the channel plate, which barrier plates are sealing the process channel. The barrier plates could be sealed with gaskets to the channel plate as mentioned before. The walls or the barrier plates may be of a heat conductive material, which make it possible to let a cooling or heating fluid pass outside the channel. One or more of the barrier plates may be of an insulating material for applications of the channel plates wherein special temperature requirements are needed. The material of the barrier plates may alternatively consist of a membrane of a suitable pore size to let a formed product or products to pass the membrane or for process fluids or additional material to be added through the membrane into the channel of the channel plate. A barrier plate may also be of a filter material. Combinations of barrier plates of different materials could also be possible. According to one alternative may at least one of the barrier plates contain a solid heat conductive material, an insulator material or a membrane material. According to one alternative may two channel plates be placed on both sides of a membrane. Thus, one channel plate will transport products and the other channel plate the process flow. Important features of the channel plate and the equipment surrounding the channel plate are flexibility and easy access. Therefore, the channel plate may be adapted to enable different operations such as for instance filtration, separations by membranes, mixing etc. The channel plate may be coated by one or more catalysts or have a design which enables mixing or to create a plug flow.

The channel plate can be manufactured as one piece according to one alternative, that the rows of units are integrated in the plate. The size or shape of the channel plate could be of any suitable design forming a flow channel in a flow module or a reactor. The material of the channel plate may be stainless steel, iron-based alloys, nickel-based alloys, titanium, titanium alloys, tantalum, tantalum alloys, molybdenum-base alloys, zirconium, zirconium alloys, glass, quartz, graphite, reinforced graphite, Hasteloy, or any other material resistant to the process media. Other suitable material for the channel plate are special materials such as plastic material such as PEEK (polyetherether ketone), PPS (polyphenylensulfid), PTFE (polytetrafluoroethylene), perfuorelatomers, or fluorelastomers, PP (polypropene), etc or combinations thereof.

According to one alternative the channel plate may be formed by parting the plate in its midplane that the complex structure of the channel could be simplified and more easily manufactured. The channel plate could thus be divided into two parts wherein the parts consist of square-shaped members having square cut-outs, and channel forming surface cut-outs. The two parts will be complement of each other and put together they will form the channel. Between the two parts may a gasket seal the channel of the two part channel plate.

The invention relates further to another alternative channel plate, which is comprised of two formed sheets or two pressed plates and a reactor plate or flow plate, which plate has gaskets on each planar side on to which the two formed sheets or the two pressed plates are mounted.

The channel of the channel plate may comprise a number of rows of units forming a serpentine path in the arrangement of units. Thus, a three-dimensional flow direction of the flow of fluids is developed in the channel of each channel plate. The fluids passing the "three-dimensional" channel may be pure liquids, mixtures of liquids, immiscible liquids, liquids with particles or liquids with dissolved or free gas.

The utility plates according to the invention can have a compartment for the channel plate and also one compartment for the turbulator insert and for the heat exchanger fluids. The utility plate or the heat exchanger plate is the heat exchanger part of a flow section which could comprise at least one utility plate and one channel plate. The channel plate may be inserted in the compartment of the utility plate according to one alternative. According to another alternative may one channel plate be inserted between two utility plates. The channel plate could be arranged within a space created by two complementing compartments of the two utility plates. The compartment of a utility plate could surround the whole channel plate or just a part of the channel plate leaving all injection ports and ports free. The compartment of the utility plate is a space which could be an elongated square wherein the channel plate may be placed or may be integrated in. The turbulator insert of the utility plate may have wings or fins attached. The turbulator insert could also be a metallic foam. The inlets or the outlets of the utility plates and/or of the channel plates may have thermo elements inserted. The utility plate may be sectioned heat exchanger plate such as the one disclosed by WO 2008/076039.

The clamping system according to the invention is connected to the flow module for controlling the forces applied to the flow module and thus also the pressure in the module. Such clamping systems can be found in WO 2008/066447 or in SE 0801181-9. The clamping system may comprise two end plates, disc springs, and tension rods. Piles of disc springs may be arranged as a first grid of springs on one of the two end plates, and the disc springs may be supported on this first end plate. Between the two end plates may one or more flow sections be placed, on the opposite end plate, the second end plate, may further piles of disc springs be placed as a second grid of springs. Grids of disc springs can also be placed between flow sections. Tension rods may connect the two end plates to distribute tension forces to the piles of discs springs when the clamping system being in a closed position.

To seal the flow module or the reactor properly, the clamping forces have to be within a proper range. The spring arrangement, i.e. a grid of spring piles is distributing the spring force on a stack of plates of a flow module such as a plate reactor. The flow module includes one or more layers of plates stacked together. The spring force F is a function of the spring length L. The spring length will vary within the range from $L_{max}$ to $L_{min}$, where $L_{max}$ is defined as free length at unloaded spring, and $L_{min}$ is defined as spring length at maximum compression. The maximum force $F_{max}$ is defined as spring force at maximum compression of the spring, and the spring force will therefore vary between 0 and $F_{max}$. The spring force $F_x$, which corresponds to $L_x$, has to be larger than force $F_1$ to make sure that no leakage will occur but the spring force should not be bigger than force $F_2$ to not risk permanent deformations. $F_1$ and $F_2$ correspond to spring lengths $L_1$ and $L_2$, respectively, and $L_1 < L_x < L_2$. By using springs or piles of springs, with an adequate force compression curve, a sufficient working range $L_2$ to $L_1$ can be achieved. The range $L_2$ to $L_1$ must be larger than other geometric discrepancies from manufacturing, assembly and operation. Such discrepancies can for example be manufacturing tolerances on flatness and thickness, or deformations originating from forces at assembly, or dimensional changes due to thermal expansion or material creep at operation.

The flow module according to the invention may comprise pressure release devices, which pressure release devices, may be connected to any number of ports, injection ports or to a flow channel inlet, a flow channel outlet, or to connections between flow sections. The pressure release devices may be passive or active. A passive pressure release device may be a bursting foil, but any suitable passive pressure release device may be used. An active pressure release device may be any number of injection units for quenching materials or substances, which may be acting on command from a computer, equipped with a monitoring and control program. Another active pressure release device may be a flow-regulating device of heat exchanger fluids, which also may be acting on command from a computer equipped with a monitoring and control program. Yet another active pressure release device may be a flow-regulating device for process materials or for added materials, which also may be acting on command from a computer equipped with a monitoring and control program.

The material or the materials of the different parts of the flow module can be selected from stainless steel, iron-based alloys, nickel-based alloys, titanium, titanium alloys, tantalum, tantalum alloys, molybdenum-base alloys, zirconium, zirconium alloys, Hastalloy, glass, quartz, graphite, reinforced graphite, PEEK, PP, PTFE etc., or combinations thereof.

In the following will the invention be explained by the use of FIGS. 1 to 25. The figures are for the purpose of demonstrating the invention and are not intended to limit its scope.

DETAILED DESCRIPTION

Figure 1:
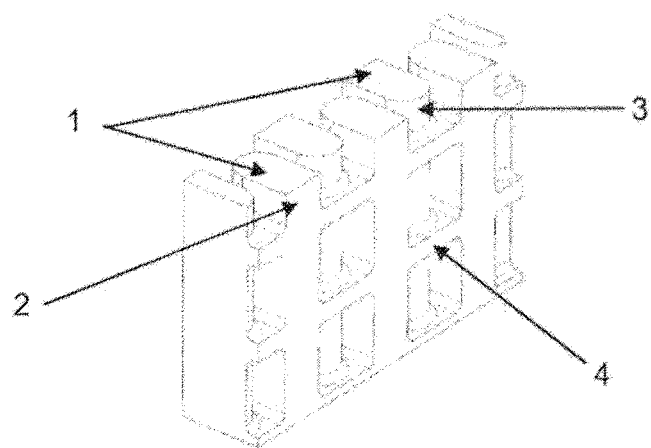
FIG. 1 shows rows of units according to the invention.
Figure 2:
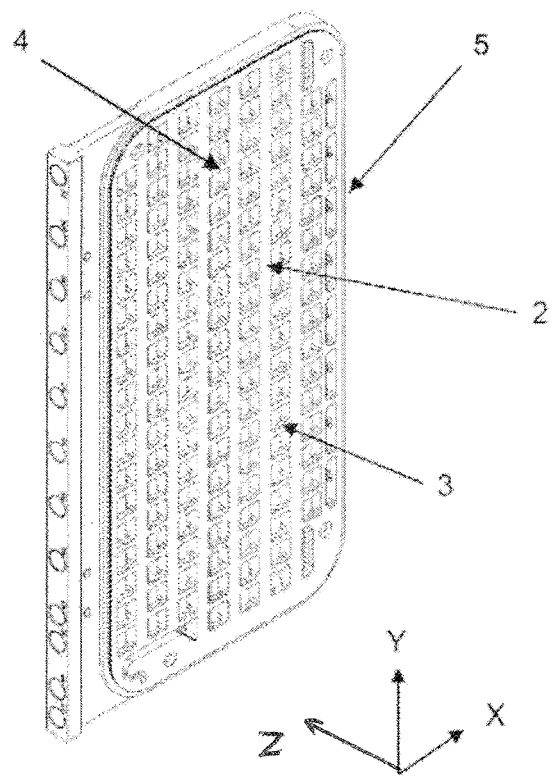
FIG. 2 shows a channel plate according to the present invention.
Figure 3:
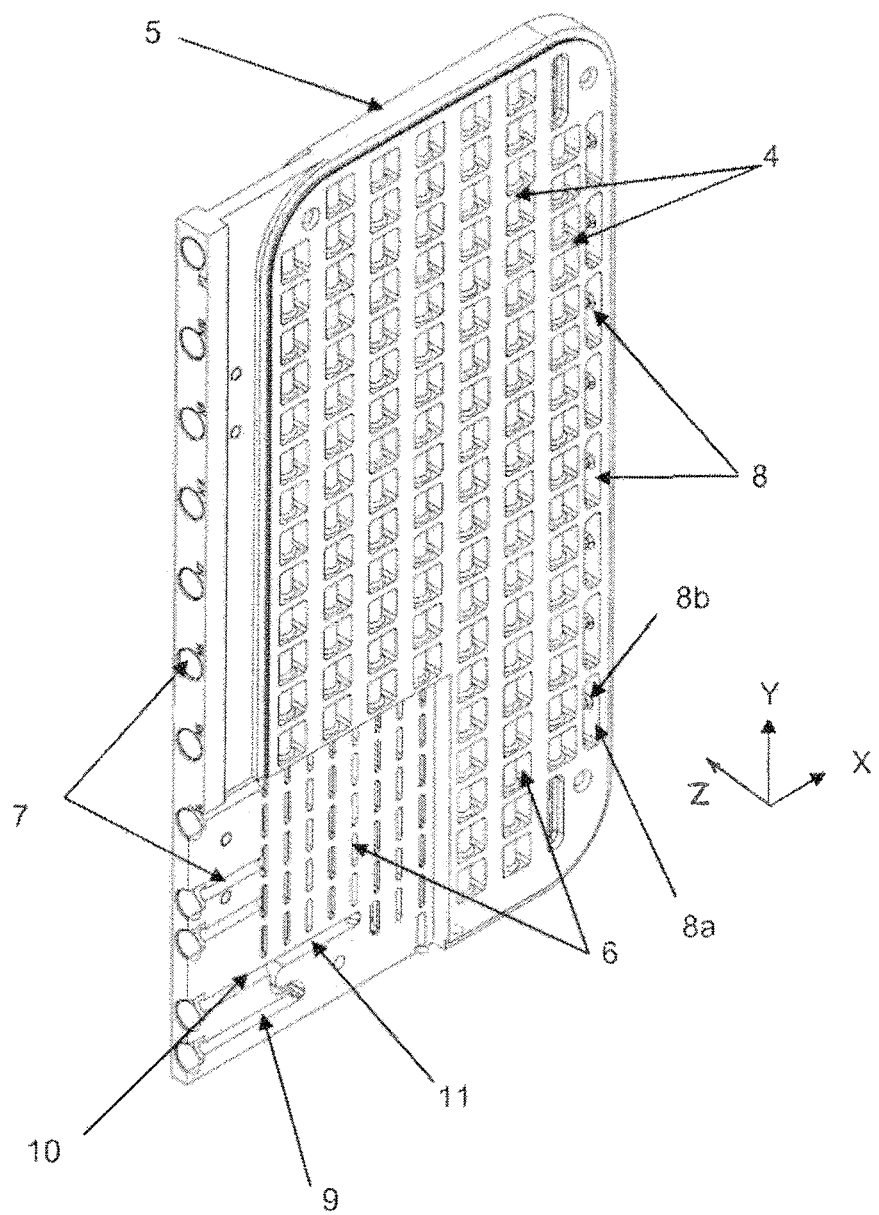
FIG. 3 shows the channel plate of FIG. 2 having a cut through area showing the channel and the ports according to the invention.

FIG. 1 is showing a few rows of units 1 according to the invention. Units 1 have one part which is planar 2 and one part which is curved 3, each unit 1 is separated from the next unit 1 by walls 4. All units 1 of the channel plate 5 constitute together one unity, i.e. the channel plate of the same material with no joints between units 1, walls 4 or rows. The planar surfaces of units 1 are lined up in an arrangement forming rows in the channel plate. The lined up rows of planer surfaces 2 form a support for instance for a gasket. Opposite the planer side of unit 1 is the curved side. Thus the arrangement of rows of units 1 will form a pattern of planer rows adjacent to curved rows, wherein each row of units 1 is separated from a next row of units 1 by a wall. FIG. 2 shows the rows of units 1 of channel plate 5, lined up to form a symmetric parallel pattern where rows of planar surfaces 2 in a Y-direction have neighbouring rows of curved surfaces 3 also in the Y-direction. The units 1 are forming a channel in an X-direction between curved surfaces 3 and barrier plates or utility plates not seen in FIG. 2. Walls 4 are dividing the channel of channel plate 5 into several sections that the channel will run from one side to the next along channel plate 5 and thereby form a long channel with several mixing zones in several channel rows. FIG. 3 shows channel plate 5 having a cut out section. The cut out section is for the purpose of illustrating channel 6 and how ports 7 are communicating with channel 6. FIG. 3 as well as FIG. 2 show turning boxes 8 which are shown on one of the sides of channel plate 5. If the channel plate is turned, the turning boxes will appear on the opposite side of the channel plate and turning boxes 8 will thus be seen on the side where ports 7 are arranged to communicate with channel 6, which is illustrated in the above mentioned cut out section. Thus turning boxes 8 are lined up in Y-direction on both sides of the channel plate. The formed space of turning boxes 8 is defined as the space between two rows of units 1 and inner side 8a of the channel plate together with curved obstacle or turning unit 8c, FIG. 4A, which obstacle 8c is part of curved part 3 of units 1. As shown in FIGS. 3, 4B and 4C, the wall 8b is an extension of walls 4 and partly divide turning box 8 into two compartments 12a and 12b which are in fluid communicating with one another. In turning box 8 wall 8b will have a reduced size compared to wall 4 that channel 6 will be able to turn from one channel row to the next channel row. In particular, the wall 8b is recessed from the planar surface 2 in a Z-direction as indicated by an arrow Z1. Recessing the wall 8b from the planar surface 2 allows fluid to flow in the turning box 8, over the wall 8b from one compartment 12a to another compartment 12b and causes a three dimensional flow resulting in an enhanced mixing in the turning box 8. The arrangement of walls 8b and units 1 of the turning boxes forces the flow in channel 6 to an enhanced mixing. Channel inlet 9 is seen in FIG. 3 this inlet is intended for the process flow of fluids. Channel inlet 9 is combined with injection port 10 to form a straight channel part 11 for mixing or blending the process flow with injected reactants or other injected fluids, which fluids are injected through injection port 10 through an injection nozzle or an inlet disperser not seen in FIG. 3.

Figure 4A:
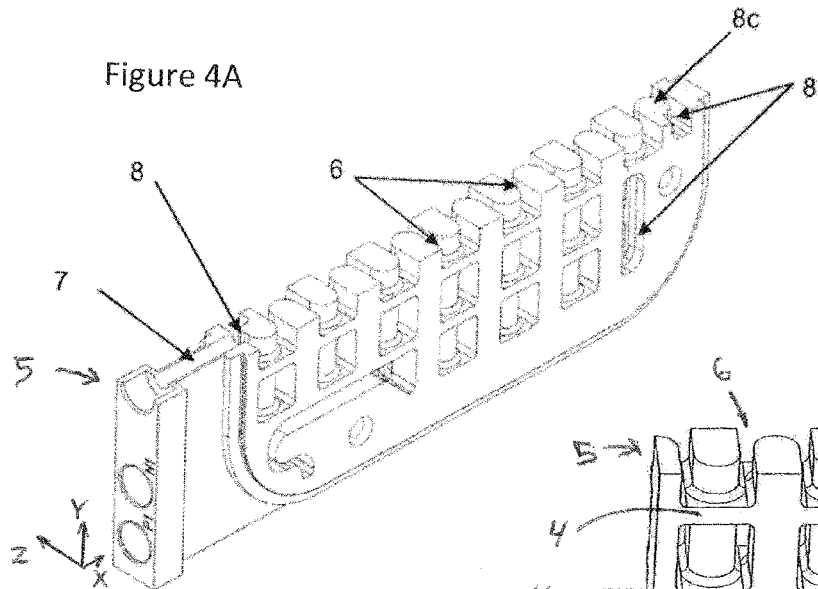
FIG. 4A shows a cross section of the channel plate according to the present invention.
Figure 4B:
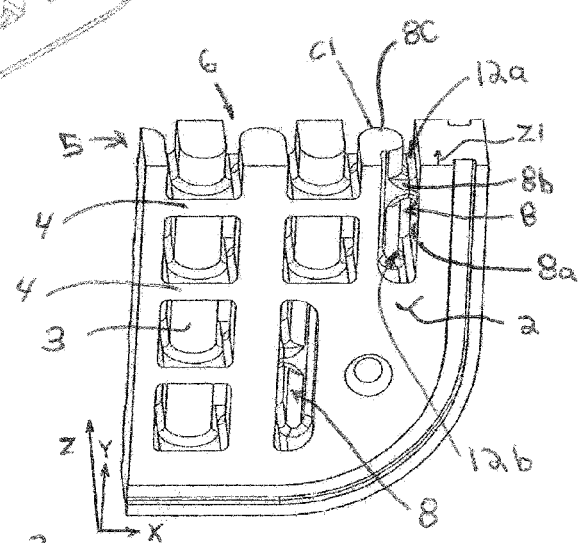
FIG. 4B shows a cross section of a portion of the channel plate according to the present invention.
Figure 4C:
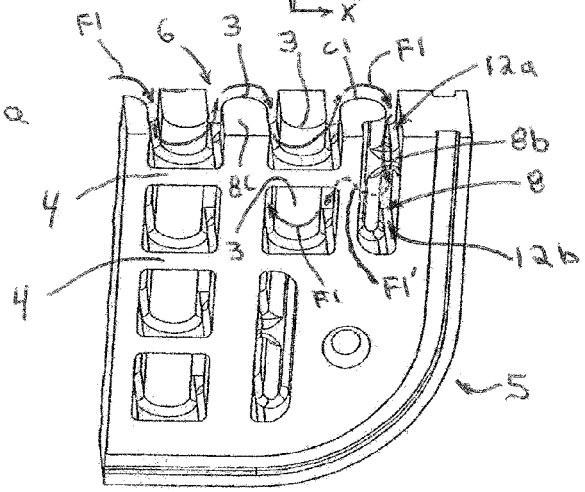
FIG. 4C shows a cross section of the portion of the channel plate of FIG. 4B shown with arrows indicating the direction of flow of fluid through the channel plate.

FIG. 4A shows a cross section of the channel plate according to the present invention, this figure shows that turning boxes 8 are arranged on both sides of the channel plate. The figure show also ports 7 going into channel 6, see also FIG. 3, or into the space within turning box 8. In FIG. 4A it is shown that in turning boxes 8 turning unit 8c has a different cross section than the units 1 of the rows. The cross section of turning unit 8c, in this figure, has a circumference C1 as shown in FIG. 4B, which is three quarters of a circle with a flat part the cross section may be defined as a P-section. Other types of cross sections of turning unit 8c are possible as long as channel 6 will turn from one channel row to another in the turning box. In ports 7 any type of equipment can be inserted such as inlets for additional reactants, inlets for additional fluids, outlets for process fluids to be tested, outlets for intermediate products to either be fed into the channel at a later stage or to be recirculated or isolated, outlets for test samples, injection nozzles, inlet dispersers, security devices for pressure release instant or controlled, sensor units, such as spectro-photometers, optical sensors, near-infrared sensors, NIR-technology, thermo couples, resistance thermometers etc.

Figure 5:
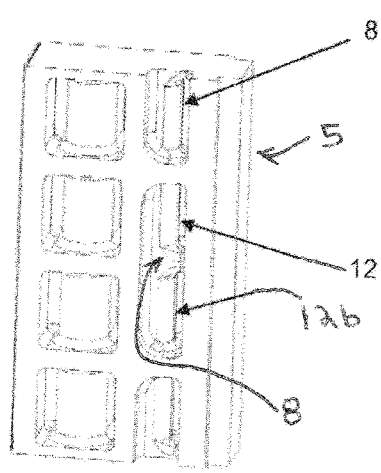
FIG. 5 shows a part of a channel plate having turning boxes at the end and at the beginning of each row of units.

FIG. 5 shows a part of a channel plate having turning boxes 8 at the end and at the beginning of each row of units. Turning boxes 8 have two compartments 12a and 12b where the channel 6 turns from one row of units to another. As shown in FIG. 4C, fluid flows in the channel 6 around the curved parts 3 of the units 1, around the circumference C1 of the turning unit 8C, over the wall 8*b* to an adjacent row of units 1 and around curved parts 3 of the adjacent row of units 1, in a serpentine manner as indicated by the arrows F1 and F1'. For clarity, the arrow F1' is shown in dashed lines to connote flow of fluid around a hidden portion of a turning unit 8*c*. In FIGS. 2 to 5 it is evident that the units 1 are forming one piece built up by several units forming several rows and that the rows of units are integrated in the plate. In these figures the units are not separate instead they are fused bonded or the channel plate is machined, casted, moulded or cut or laser cut or Electrical Discharge Machining (EDM), spark eroded, from one piece of material.

Figure 6:
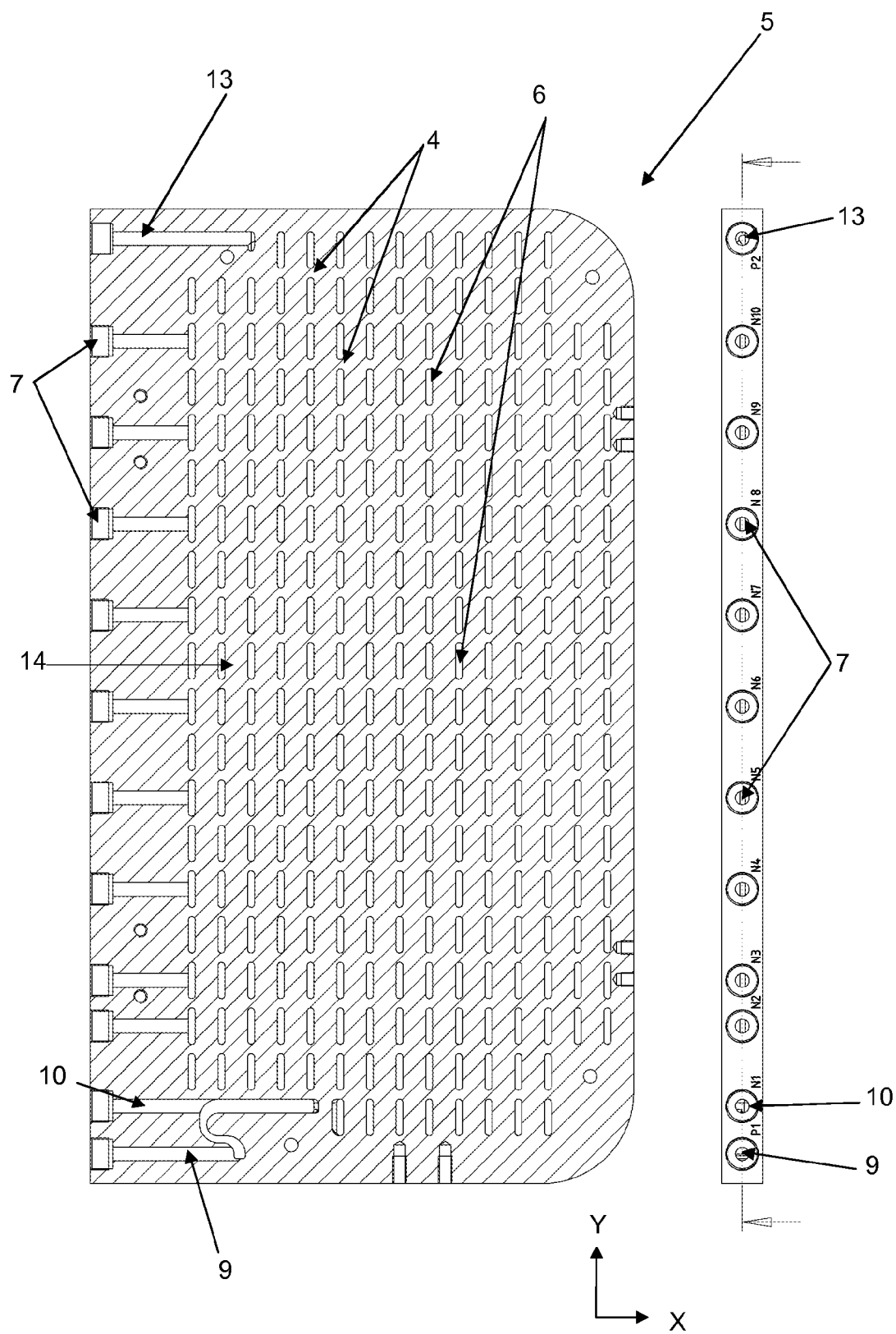
FIG. 6 shows a cross-section and a side view of a channel plate according to the invention.

FIG. 6 shows a cross-section and a side view of a channel plate 5 according to the invention. The figure shows inlet 9 and outlet 13 and between the inlet and the outlet runs flow channel 6 in X-direction. The channel runs up and down through each unit through each channel row 14, which rows 14 are in X-direction in this figure, the figure shows also that the channel contains several rows of units stacked in Y-direction without any joints between the units. The figure shows also walls 4 between the units. On the side view ports 7 can be seen, the side view show that a channel plate can have several ports 7. On the side view can also inlet 9, injection port 10 and outlet 13 can be seen. A channel plate according to the invention may have ports on any or both sides where the turning boxes are arranged, each row may have a port 7 on each side of the channel plate.

Figure 7:
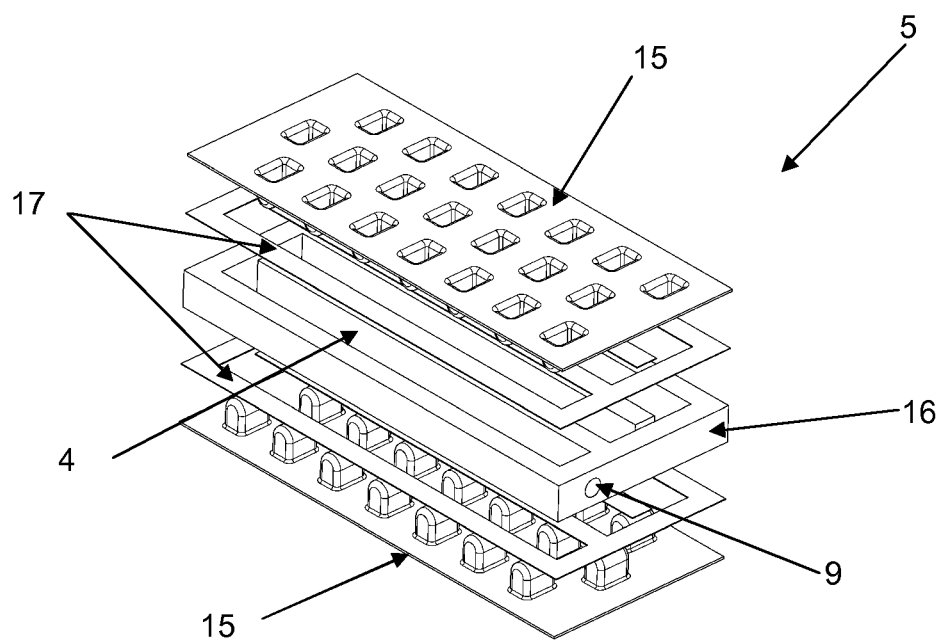
FIG. 7 shows an alternative channel plate.
Figure 8:
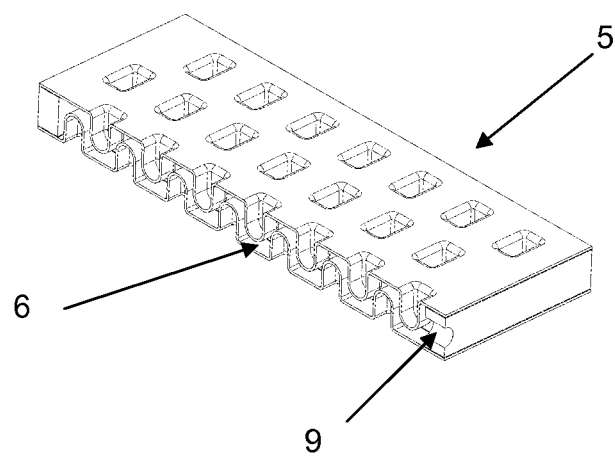
FIG. 8 shows the channel of assembled channel plate of FIG. 7.

FIG. 7 shows an alternative part of the channel plate 5 according to the invention, wherein the plate comprises two formed sheets 15 or two pressed plates 15 and a frame 16 having walls 4 separating the formed channel 6 from the adjacent formed channel 6. Plates 15 are placed in opposite directions on both sides of frame 16 thus forming channel 6, which channel runs between plates 15 and walls 4 in frame 16. Two gaskets 17 on both sides of frame 16 are sealing the channel plate. In FIG. 7 can inlet 9 for process fluids be seen, but the outlet is not shown in the figure. FIG. 8 is showing channel 6 of the assembled channel plate 5 of FIG. 7 the channel runs along the pressed plates and is separated by walls 4 not seen in the figure, the figure shows how inlet 9 is communicating with channel 6, but the channel outlet can not be seen in this figure. Figure is not showing injection port 10 but of course this channel plate can be equipped with injection port 10 as well as ports 7. The channel turns in turning boxes 8, but this is not shown in this figure.

Figure 9:
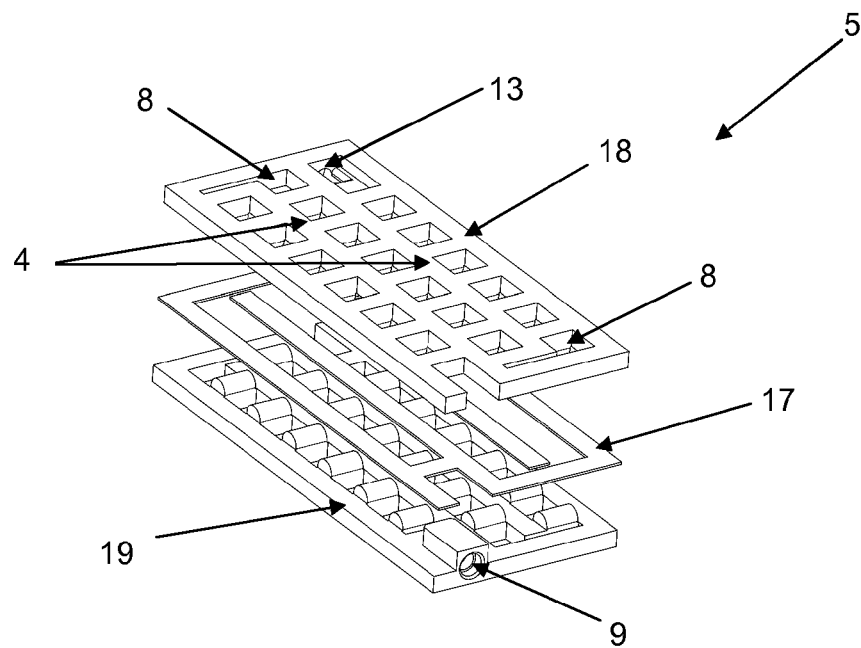
FIG. 9 shows another alternative channel plate of the present invention.
Figure 10:
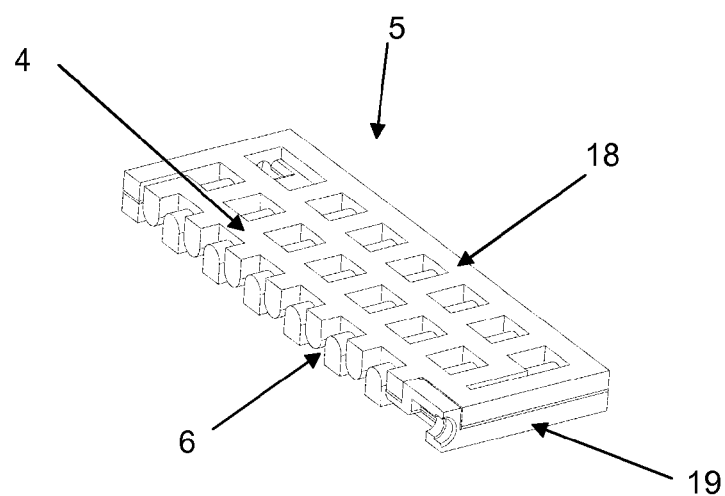
FIG. 10 shows the assembled channel plate of FIG. 9.
Figure 11:
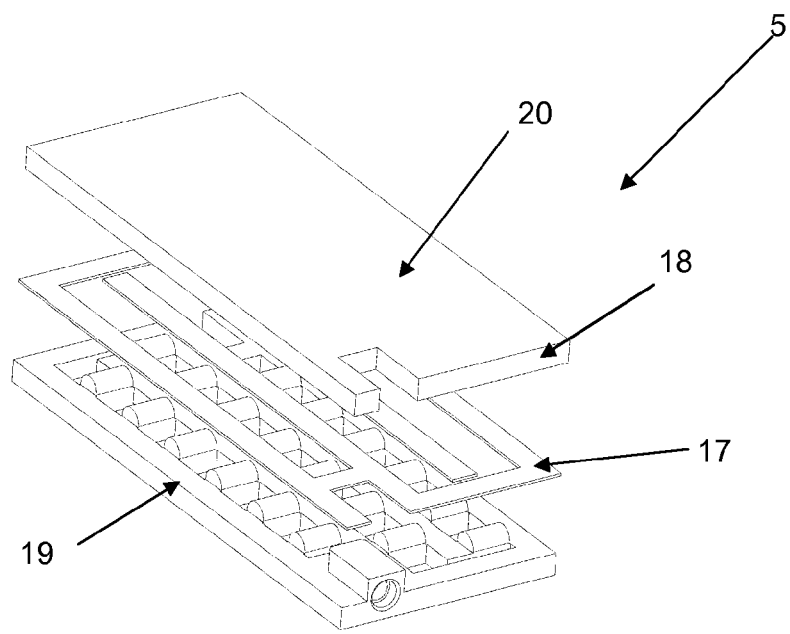
FIG. 11 shows another version of the channel plate.
Figure 12:
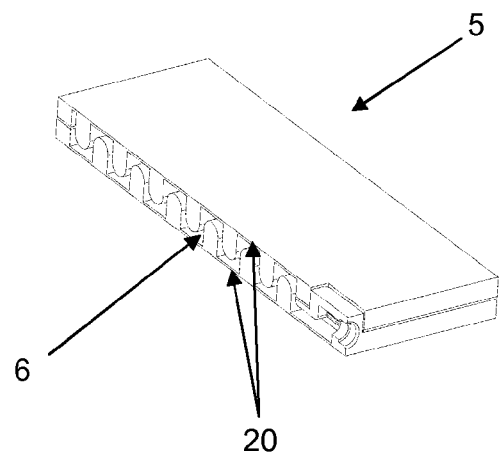
FIG. 12 shows an assembled channel plate of FIG. 11.

FIG. 9 shows another alternative part of channel plate 5 of the present invention. According to this alternative is the channel plate divided in midplane into two halves 18 and 19. Half 18 fits into half 19 forming channel 6 when assembled. A gasket 17 is sealing the two halves of the channel plate according to this version of the invention and form channel 6 between the halves and walls 4. An inlet port 9 for process fluids can be seen in the figure, and an outlet 13 is letting out the products from channel 6 of the channel plate. Turning boxes 8 is turning channel 6 from one row to the next. In FIG. 10 are the two halves 18 and 19 of channel plate 5 assembled and a channel 6 is formed between the two halves 18 and 19. FIG. 11 is showing yet another version of part of channel plate 5 which is divided in midplane. According to this version two barrier 20 plates are integrated with halves 18 and 19. A gasket 17 is sealing the formed channel of the channel plate. FIG. 12 shows how channel 6 is sealed to the outside by barrier plates 20.

Figure 13:
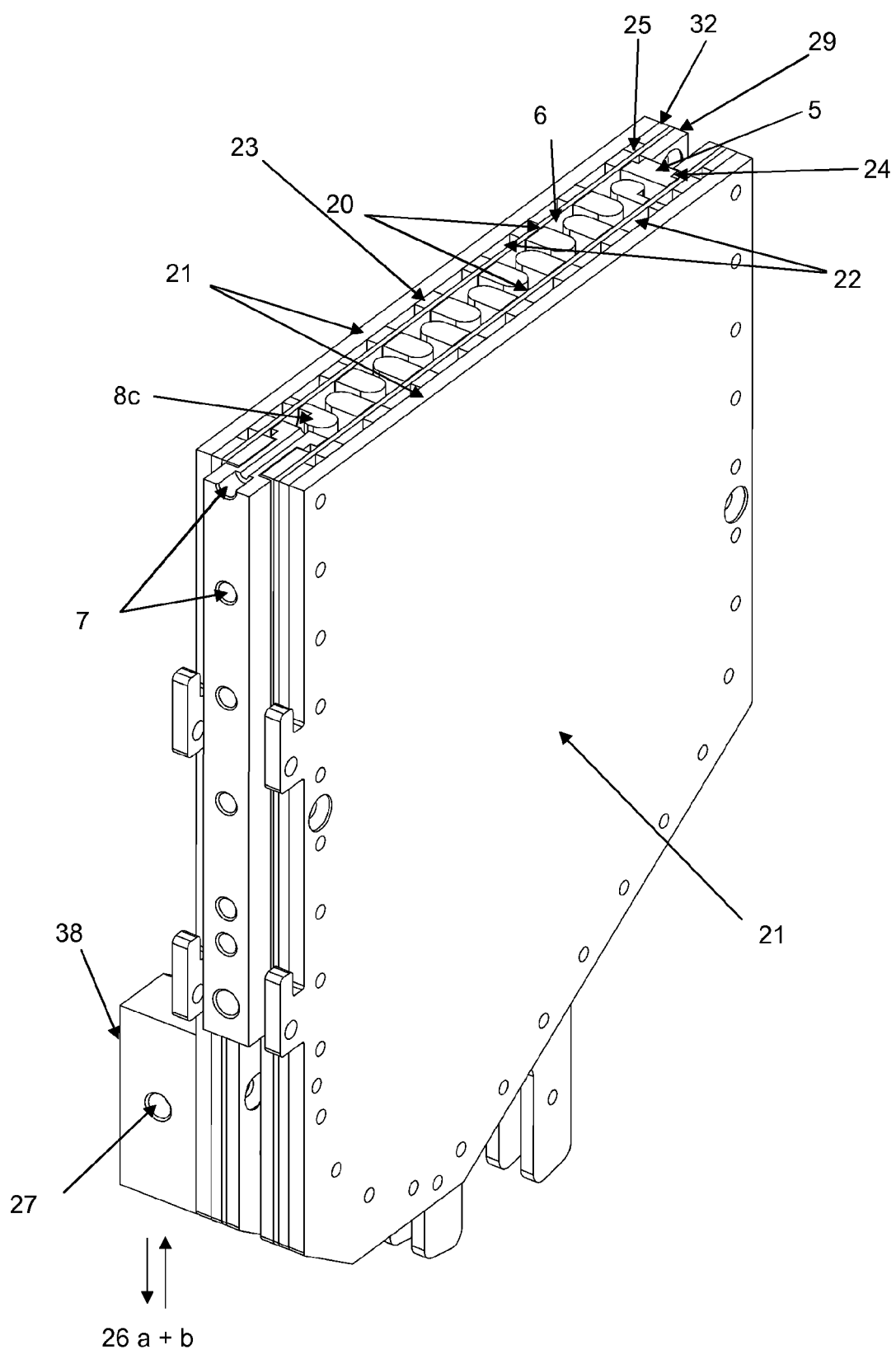
FIG. 13 shows a channel plate inserted between two utility plates.

FIG. 13 shows channel plate 5 inserted between two utility plates 21. According to this alternative two barrier plates 20 are sealing process channel 6 from utility channels 22 of utility plates 21. Within utility channels 22 are heat exchanger fluids transferring the heat or cold to and from the process fluids in process channel 6. This figure shows one alternative shape of a turning box unit 8*c*, which has a cross section of a three quarter circle forming a P-section. The figure shows also how turbulator insert 23 of the utility plate is supporting the planar side of a unit of channel plate 5. Thus, one utility plate 21 comprises utility flow channels 22, turbulator insert 23, barrier plate 20, the utility plate may also comprise other components not mentioned here. Ports 7 are communicating with process channel 6 and the ports could be equipped with different sensors, nozzles etc. O-rings can be sealing the channel plate against barrier plates 20, the O-rings can be placed in groove 24 on both sides of channel plate 5. In space 25, between frame 32 and turbulator insert 23, can O-rings seal utility plate 21 against barrier plates 20. Outlet 26*a* or inlet 26*b* (i.e. 26 a+b), not seen in the figure, for heat exchanger fluids are placed on the outside of utility plates 21. A port 27 for thermo couples or resistance thermometers is in position at the inlet or the outlet for the utility flow that the temperature could be monitored.

Figure 14:
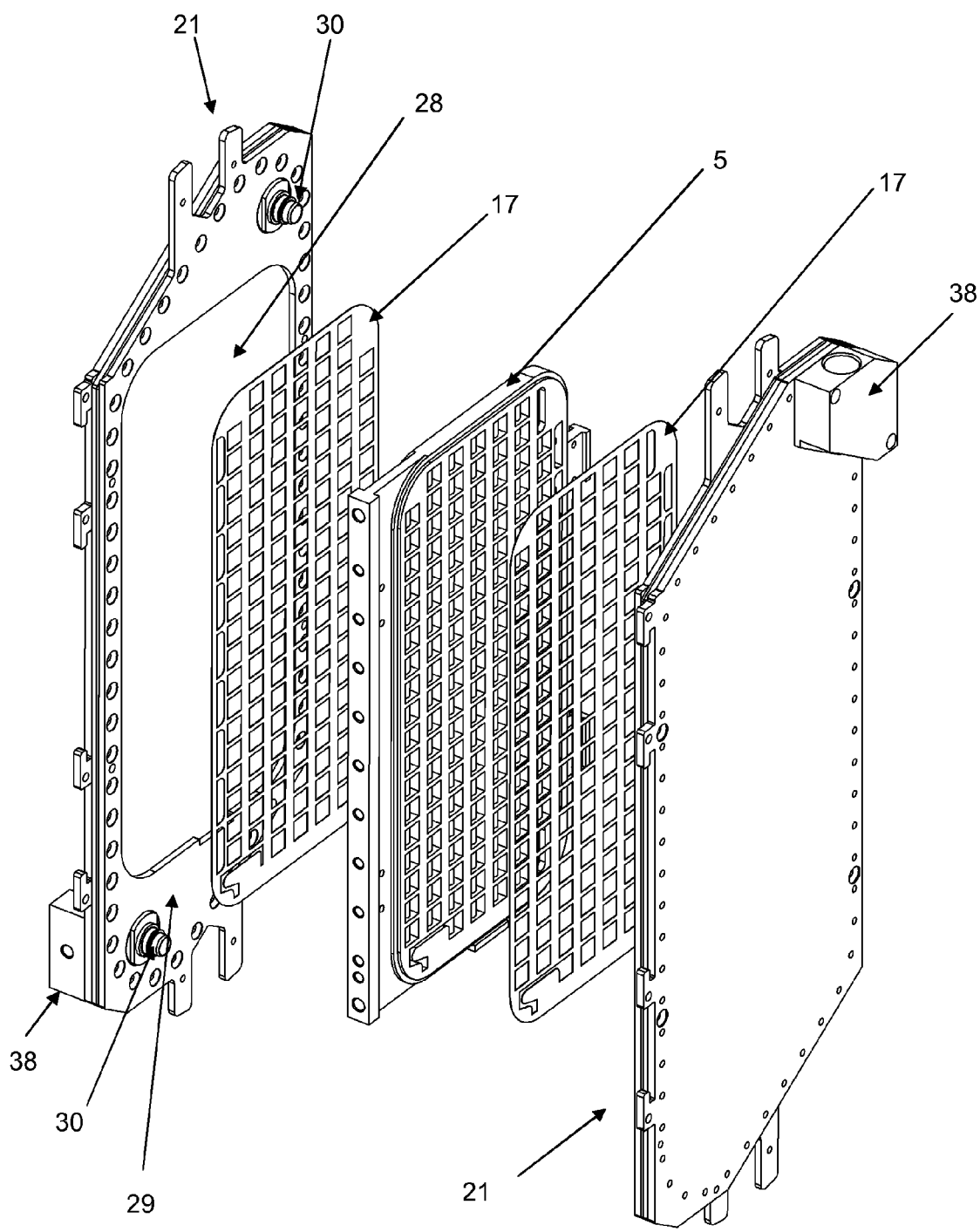
FIG. 14 shows how the channel plate is arranged between two utility plates according to one alternative of the invention.

FIG. 14 shows how channel plate 5 is arranged between two utility plates 21. Channel plate 5 fits in compartments 28 in utility plates 21. Barrier plates 20 and frames 29 form compartments 28. Channel plate 5 is fitted in compartments 28 and gaskets 17 are sealing the process channel against the integrated barrier plate of compartments 28. Gasket 17 has cut through areas corresponding to the planar surfaces 2 of channel plate 5 and thus is sealing channel 6 of channel plate 5 against barrier plates 20, that the media in channel 6 is in no contact with gasket's 17 planar face or have little or minimized contact with any edges of gasket 17, when the plates are assembled. FIG. 14 shows also connection pipes 30. Connection pipes 30 connect utility plates 21 with each other that the heat or cold exchanger fluids could be transported between utility plates 21.

Figure 15:
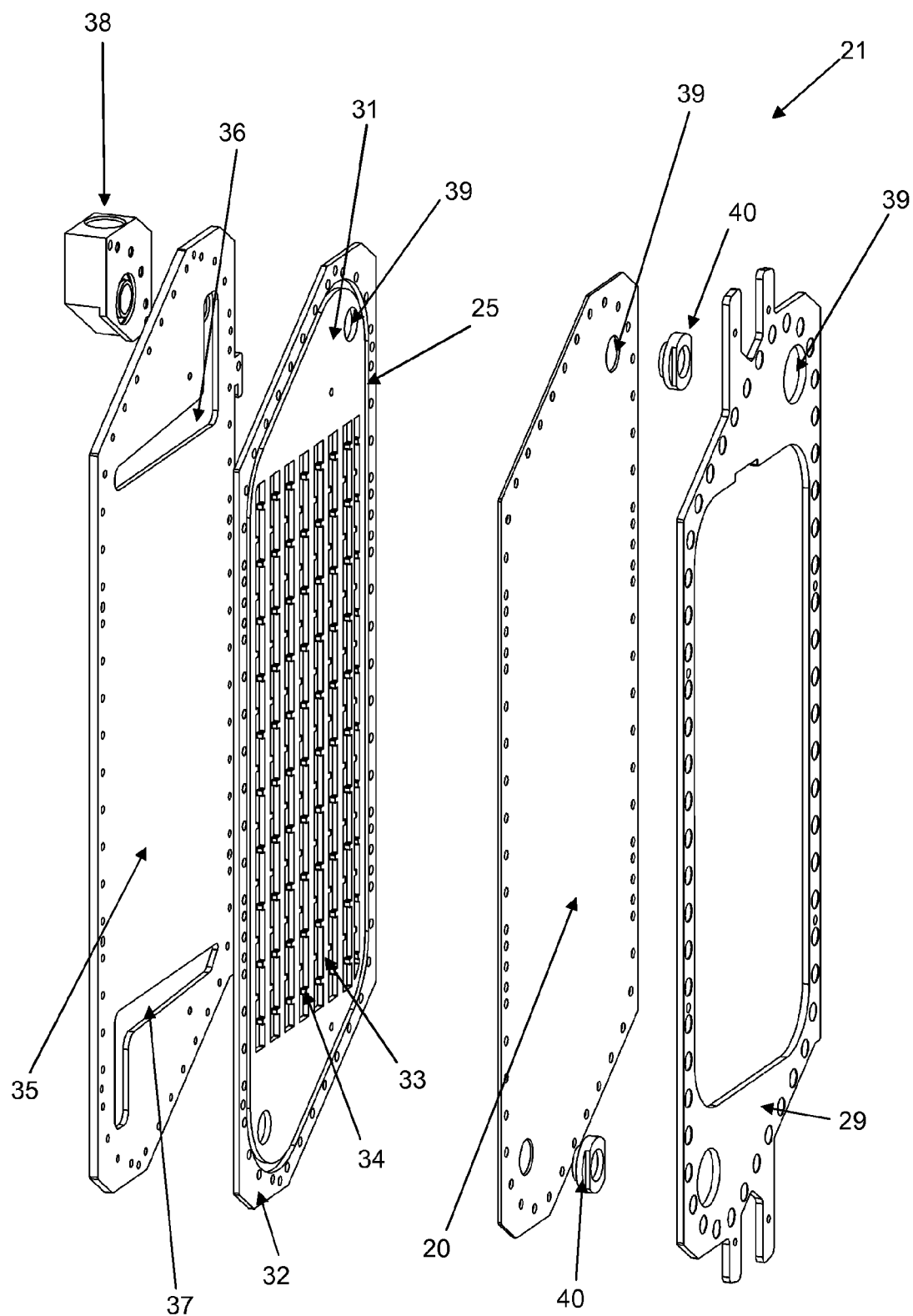
FIG. 15 shows a utility and how a turbulator is arranged in the utility plate.

FIG. 15 shows utility plate 21 according to the invention and how a turbulator plate 31 is arranged in utility plate 21. In FIG. 15 turbulator plate 31 is fitted into a frame plate 32 and sealed with an O-ring not seen in the figure. Turbulator plate 31 could also be fitted in a compartment formed by an integrated frame plate and barrier plate in the utility plate, this is not seen in the figure. The turbulator part of turbulator plate 31 has a pattern in form of rows 33 corresponding to the planar rows of the channel plate, the planar rows of the channel plate are not shown in FIG. 15. Rows 33 have fins 34 for enhancing turbulence in the flow of heat exchanger fluids and thus the heat transfer. Fins 34 are designed also to correspond to the design of the channel plate, and fins 34 give extra support to walls 4 of channel plate 5 as well as extra turbulence in the heat exchanger flow. It is important that the channel plate is supported to provide good contact pressure on gaskets especially when the flow module operates under high pressure. A compartment for a channel plate, which channel plate is not seen in the figure, is formed by a barrier plate 20 which is mounted to a frame 29 when the utility plate is assembled. Barrier plate 35 is an integrated barrier plate having heat exchanger fluids inlet channels 36 and outlet channels 37. Inlet channel 36 and outlet channel 37 could change place depending the flow direction of the heat exchanger fluids. Inlet 38 is communicating with inlet channel 36, inlet 38 could also be an outlet when the utility flow is changed. Port holes 39 in the plates are for transportation of heat exchanger fluids between the plates. Communication pipes 40 are fitted with a seal in port holes 39 for safe transportation of the fluids.

Figure 16:
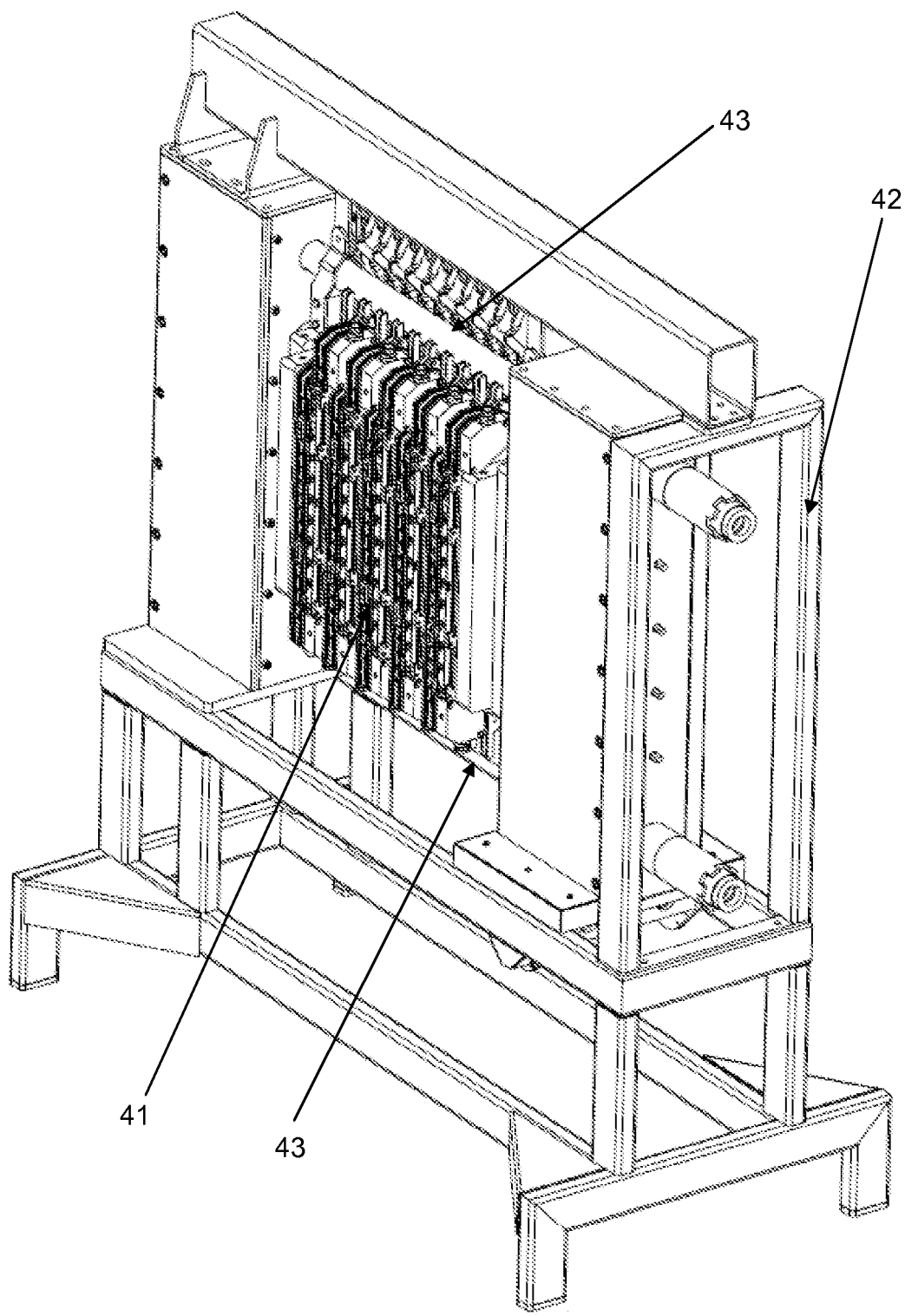
FIG. 16 shows an assembled flow module according to one alternative of the invention.

FIG. 16 shows assembled flow sections 41, in a flow module according to the invention. Flow sections 41 are arranged in a module frame 42. Flow sections 41 are assembled between two tension rods 43. Depending on size, weight and operation pressure the flow module could be assembled differently, for instance a small flow module, not shown in the figure, does not need a module frame 42 instead tension rods alone could be sufficient in some applications, if the frame is redundant then the tension rods need to be screwed together and there is a need for more tension rods than shown in this figure.

Figure 17:
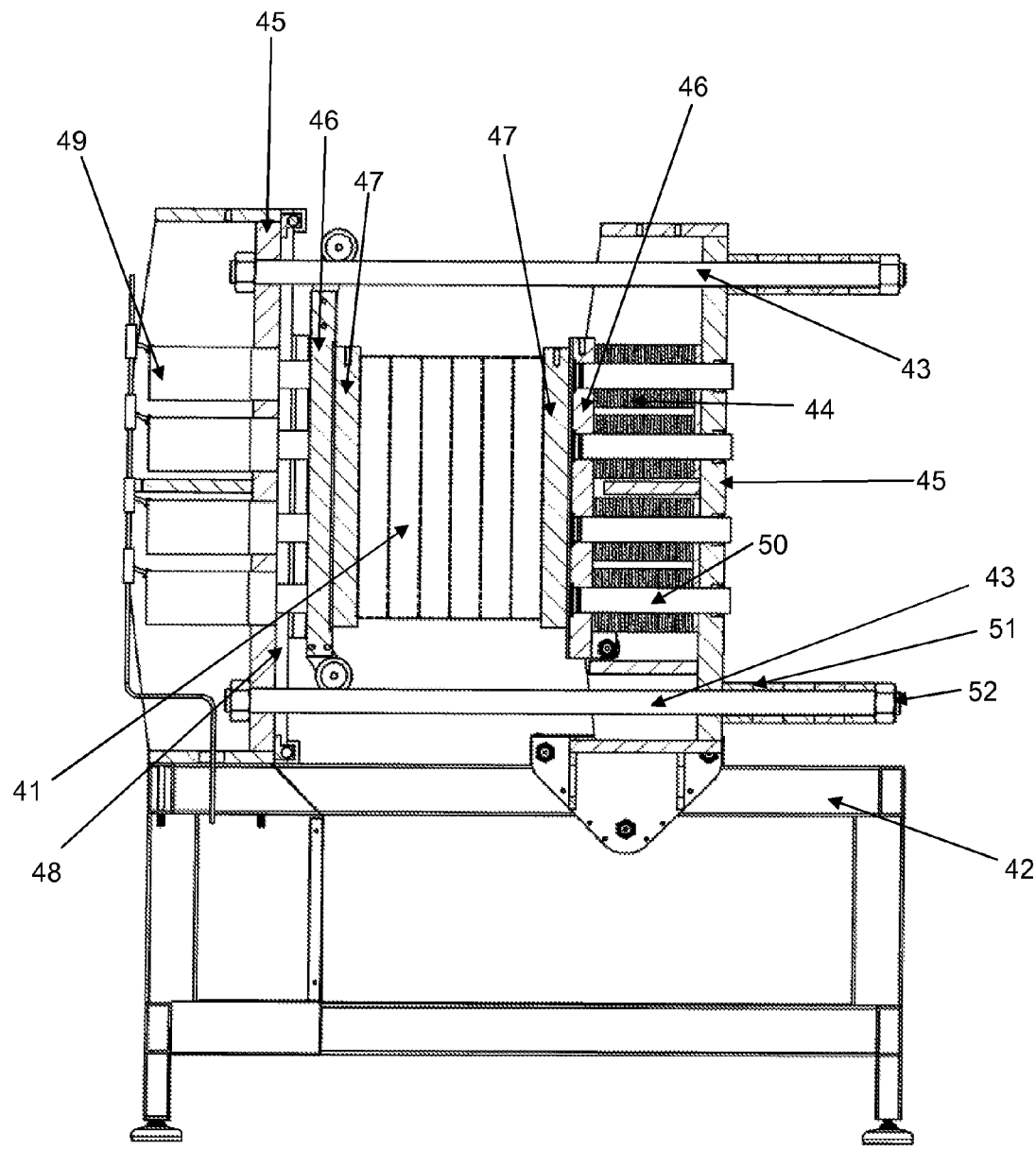
FIG. 17 shows an assembled flow module of the invention having a frame, which comprises two tension rods and two end plates, which frame is holding the channel plates and the utility plates into place by aid of hydraulic cylinders.

FIG. 17 shows another alternative of the invention wherein module frame 42 is holding flow sections 41 into place, not shown in detail in this figure. In this figure flow sections 41 are kept in place by the force from a grid of springs 44 and end plate 45. According to this alternative of the invention distribution plate 46, and pressure plates 47 are placed between two end plates. Two distance blocks 48 are placed between or removed from end plate 45 and distribution plate 46 with the aid of hydraulic cylinders 49. Distance blocks 48 are in closed position, i.e. placed between in this figure. Grids of springs 44 are arranged between a distribution plate 46 and one end plate 45 in this figure, but grids of springs could be arranged on both sides of flow sections 41. The forces from hydraulic cylinders 49 can be released that flow sections 41 are kept into place without the aid of hydraulic cylinders 49. The force on flow sections 41 can be measured by measuring the distance between one end plate 45 and how far pistons 50 have reached outside end plate 45. The two end plates 45 are positioned so that the intended number of flow sections 41 can be entered between them when in open position. The distance between the two end plates may be adjusted by choosing the number of sleeves 51 and tightening of nuts 52 on each tension rod 43.

Figure 18:
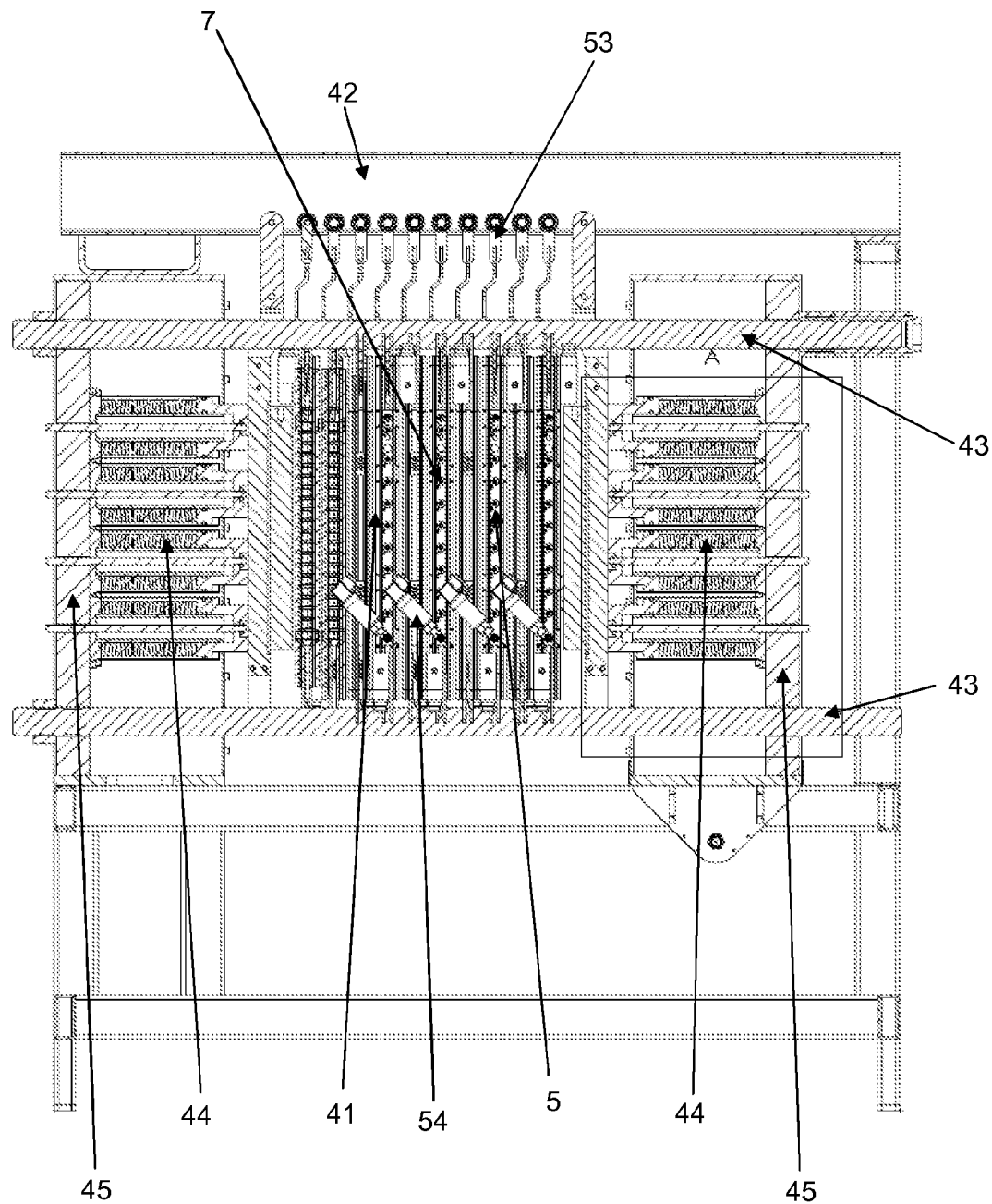
FIG. 18 shows an assembled flow module according to another alternative of the invention wherein both end plates are arranged with grids of springs.

FIG. 18 shows an assembled flow module according to another alternative of the invention wherein each of the two end plates 45 are arranged with grids of springs 44. In this figure the hydraulic tools such as hydraulic cylinders or hydraulic actuators are not shown. In some applications the hydraulic tools may be removed. Tension rods 43 are holding flow sections 41 into place in horizontal position when the flow module is clamped. FIG. 18 is also showing how channel plates 5 are arranged in flow sections 41, in this view can port holes 7 be seen on channel plates 5. Flow sections 41 are also hold in positions by holding means 53 which are hanging from a beam of frame 42. FIG. 18 is showing port instrumentation 54 with pressure transducers as an example.

Figure 19:
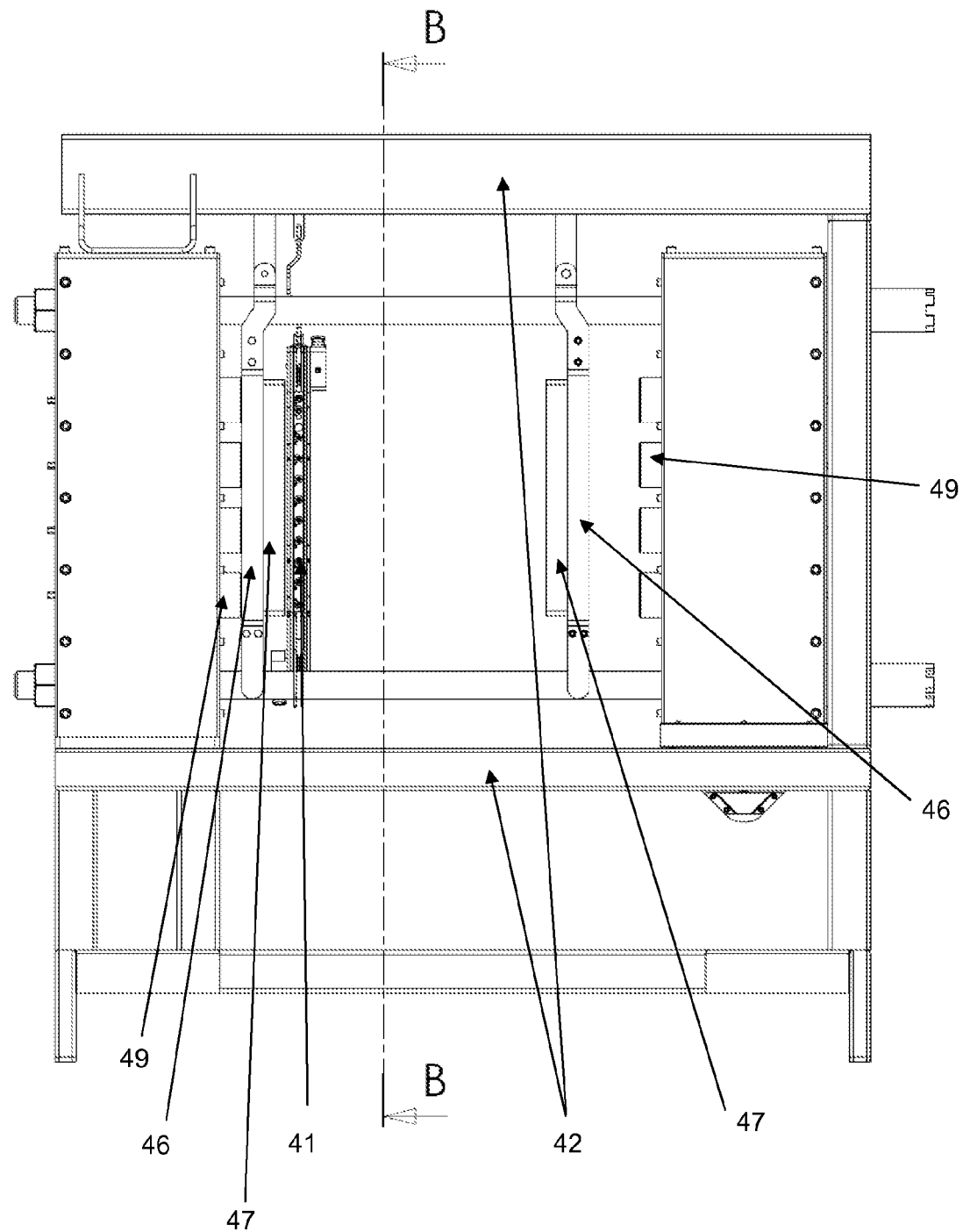
FIG. 19 shows an assembled flow module having a section line B-B.
Figure 20:
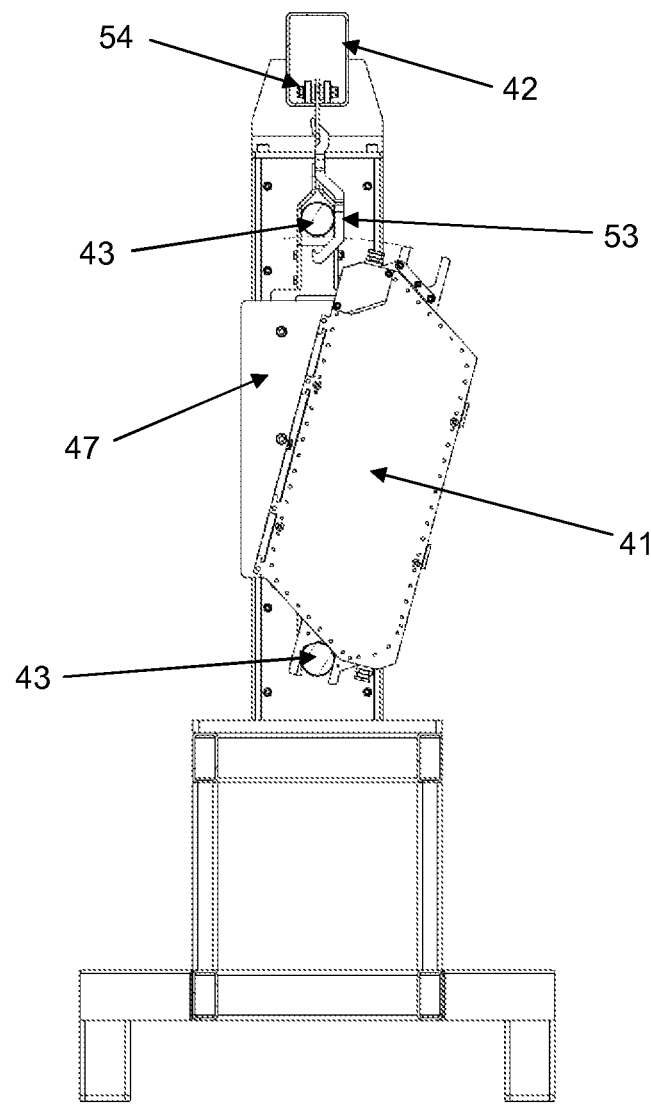
FIG. 20 shows section B-B and how the flow section is fitted into position.
Figure 21:
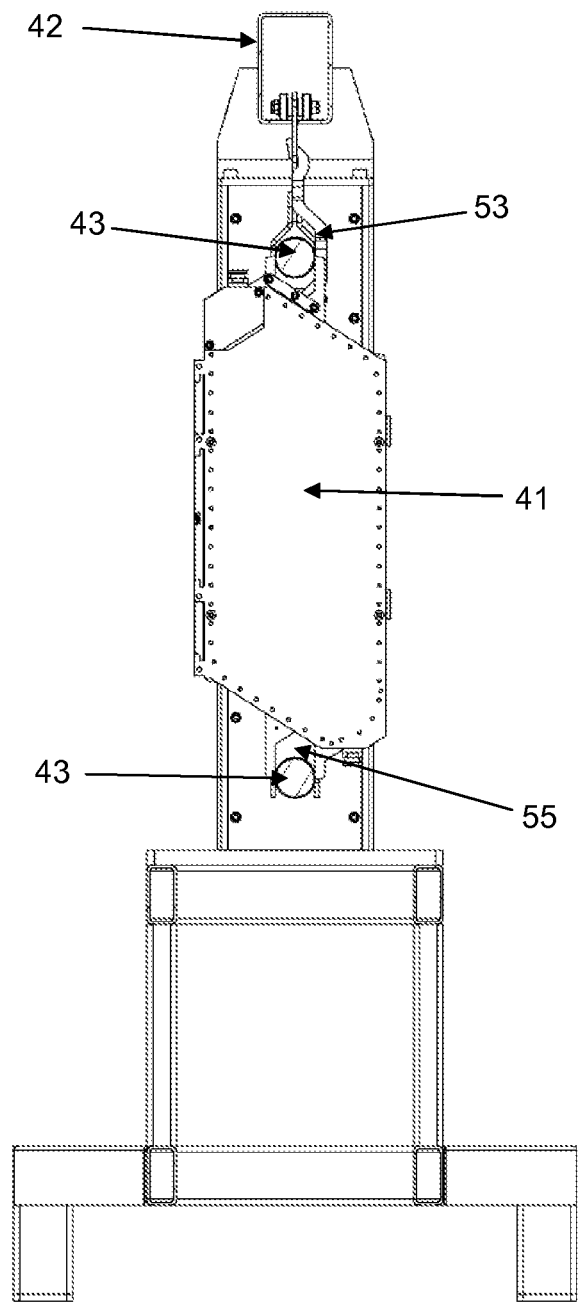
FIG. 21 shows section B-B with the flow section arranged between two tension rods.

FIG. 19 shows a section line B-B on an assembled flow module with frame 42 and one flow section 41. This figure shows also two pressure plates 47. FIGS. 20 and 21 are two views of section B-B showing how flow section 41 is put into position in frame 42. FIG. 20 shows how flow section 41 is fitted on to lower tension rod 43. The figure shows also that the top front part of flow section 41 can pass top tension rod 43 and fit into place between the two tension rods 43. Means 53 for mounting flow section 41 in hanging position is arranged from the beam of frame 42, in this figure are the mounting means 53 in form of hooks but any suitable means can be applied and are easily movable by roller device 54. FIG. 21 shows flow section 41 in hanging position between the two tension rods 43 by means of hanging means 53. A gap 55 is thus formed between flow section 41 and the lower tension rod 43, by this arrangement is tension rod 43 not heavily loaded with the package of flow sections 41 and only forces created by screwing together the module will be forced on tension rods 43, since the weight of the package of flow sections 41 etc. will be on the beam of frame 42. Tension rods 43 are thus holding the flow section package into place sideways.

Figure 22:
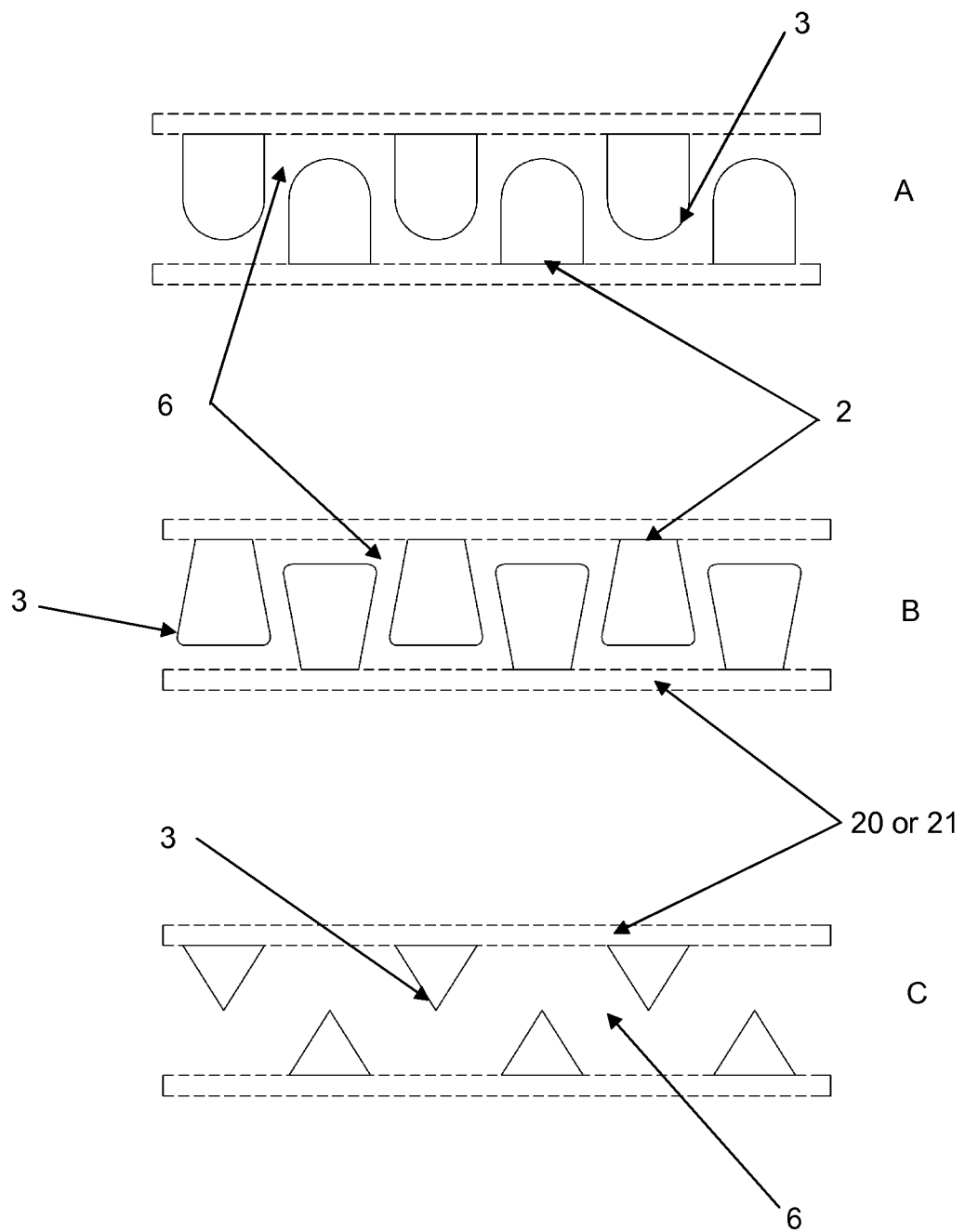
FIG. 22 shows three examples of channel forming surfaces according to the invention.

FIG. 22 shows three examples of rows of units forming process channel 6. The units have planar surfaces 2 which are turned towards barrier plates 20 or utility plates 21. Two channel plates can be separated by a membrane or a filter instead of barrier plates 20 or utility plates 21, this is not shown in the figure, planar surfaces 2 are turned to the membrane or to the filter in case of a membrane or a filter. The examples of FIG. 22 are illustrating how channel forming surfaces 3 are forming channel 6 between barrier plates 20 or utility plates 21. In this figure are channel forming surfaces 3 represented by curved convex surfaces in alternative A, trapezoid surfaces in alternative B, and triangular surfaces in alternative C. According to the invention are all suitable channel-forming surfaces included as long as process channel 6 receives the necessary properties.

The purpose of the following Examples is to illustrate the performance of the multipurpose flow module of the invention, and is not intended to limit the scope of the present invention.

EXAMPLE 1

Residence Time Distributions (RTDs)

RTDs provide information on the axial macro mixing characteristics of a reactor. Interpretation of the RTD by use of a dispersion model enables an assessment to be made of the approximation to or deviation from plug flow. In this Example RTDs are measured by a stimulus-response technique. Optical probes are positioned at the inlet and outlet of the process side of one flow plate of the invention, and a pulse of dye is injected upstream of the inlet probe.

Figure 23:
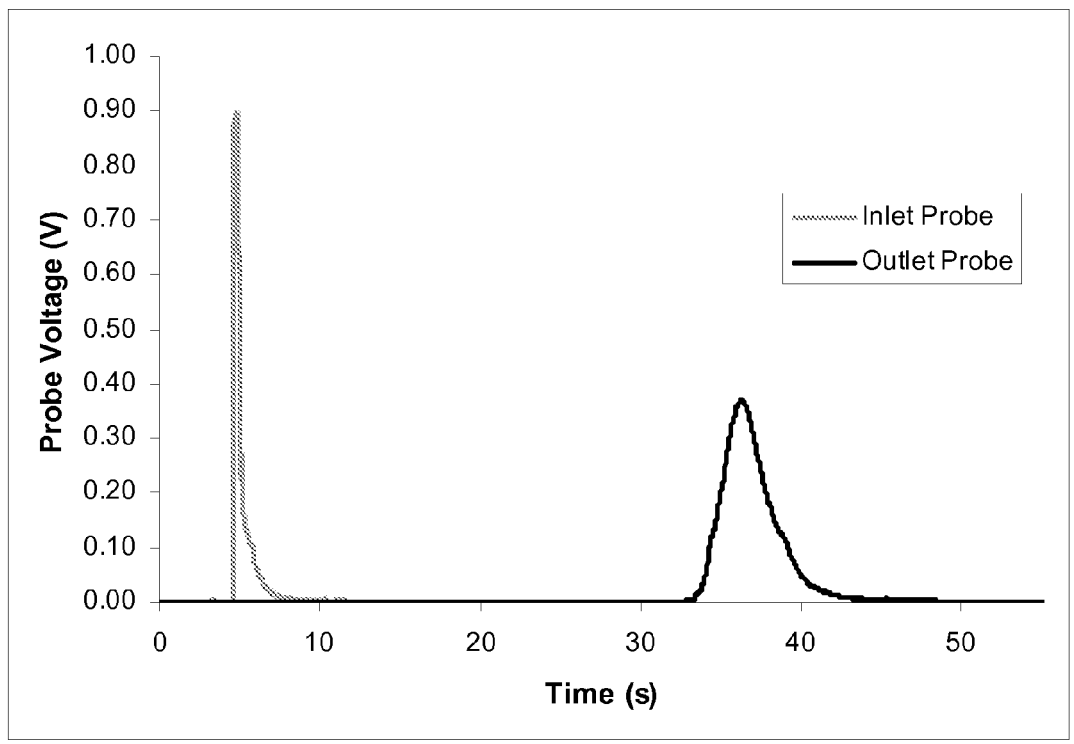
FIG. 23 is a graph showing the Residence Time Distributions (RTDs) of Example 1.

FIG. 23 shows that for every flow-rate selected in the range to be studied (10-100 l/hr), the change in absorption with time is measured, typically resulting in hundreds or thousands of data points being collected over a few seconds or few minutes from each probe. These data may be block averaged. The RTD is then determined from the inlet and outlet responses by deconvoluting the following equation: Outlet response=(Exit age distribution)×(Inlet response). By fitting an axial dispersion model to the RTDs measured at the selected flow-rates, it is possible to calculate the Peclet number (Pe) for each flow-rate, which is defined by $$Pe = \frac{uL}{D_a}$$

where u is the average linear flow velocity, L is the length of the flow channel and $D_a$ is the axial dispersion coefficient. For ideal plug flow, Pe→∞ and for ideal back-mixed flow Pe→0. That means that from a practical technical view Pe>>1 for plug flow and Pe<<1 for full back-mixed flow.

The Conditions for One Flow Plate of the Invention Were

Dimensions of the flow channel of the reactor plate were: cross-section 3.0 mm×16 mm in average, length of the flow channel approximately 6 m.

Flow Rate=53 l/hr; Volume of Injected Dye=1.0 ml; Concentration of Injected Dye=0.26 g Nigrosine/L.

The results of the measurements are summarised FIG. 23, which shows the RTD collected for the one flow plate. There are neither short cuts nor stagnant regions, thus a plug flow was created in the tested flow channel FIG. 23 is also showing that the shape of the distribution of the dye is essentially the same at the inlet probe as at the outlet probe, which indicates that the flow in the flow channel can be considered a plug flow, which is also confirmed by the Peclet number. The Peclet number calculated from this data≈800.

EXAMPLE 2

Nozzles

Figure 24:
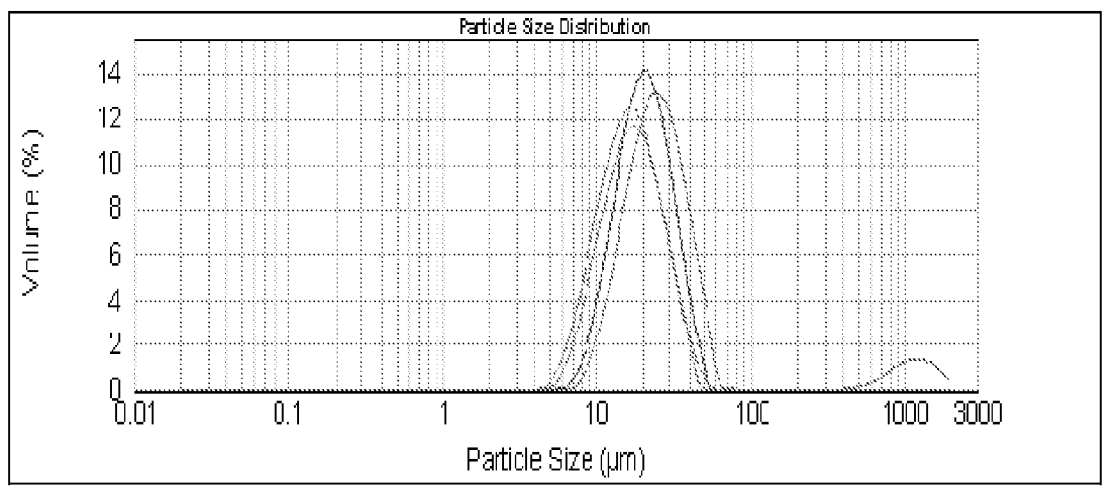
FIG. 24 is a graph showing droplet size distributions of Example 2.

A number of different injection or dispersion nozzles were tested in a reactor plate. The nozzle was operating under different pressures and flow rates and iso-dodecane was injected into water to form the "oil in water" dispersion. The injection pressures were 2, 4, 6, and 8 Bar respectively, with pressure being increased by increasing the flow rate through the nozzle, so the dodecane/water ratio is different in each test. The droplet size distributions were evaluated, and selected results are summarised in FIG. 24 for a nozzle with 10 off 140 micron holes.

TABLE 1

Test conditions and calculated $d_{32}$
Main flow at 50 L/h.

| $Q_{tot}$ [kg/h] | $Q_{tot}$ [L/h] | Press. [bar] | Press. Meas. [bar] | $d_{32}$ [μm] |
|---|---|---|---|---|
| 11.32 | 15.03 | 2.00 | 2.01 | 21,949 |
| 15.81 | 20.99 | 4.00 | 4.02 | 18,720 |
| 19.07 | 25.34 | 6.00 | 6.03 | 14,694 |
| 23.58 | 31.32 | 8.00 | 8.00 | 16,899 |

A higher pressure drop decreases the size of droplets produced by the nozzle. Mass-transfer rates, in a chemical reaction, are strongly dependent on interface surface area between the two media and hence decreased droplet size supports faster reaction rates.

EXAMPLE 3

Heat Exchange

Figure 25:
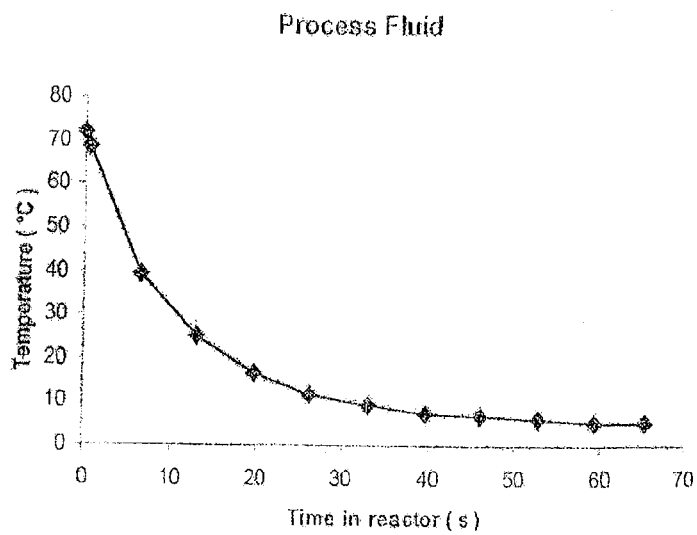
FIG. 25 is a graph showing temperature profile of a single flow section of Example 3.
Figure 26:
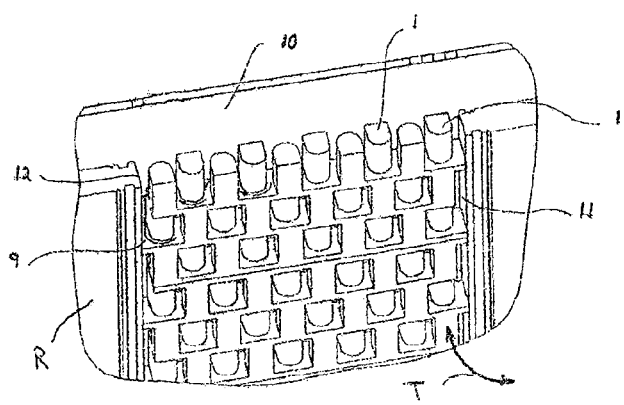
FIG. 26 is a perspective view of a prior art reactor chamber with an insert disposed therein.
Figure 27:
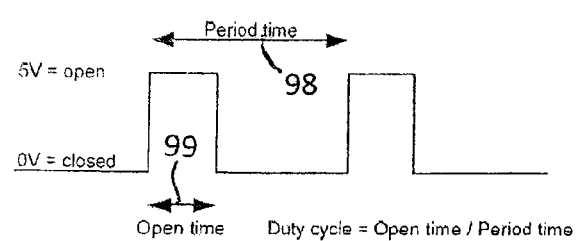
FIG. 27 is a histogram showing duty cycle of a valve.

In this experiment was the thermal profile of the process fluid travelling along the flow channel of one single flow section carried out. For simplicity water was used both in the channel plate, the process fluids, and in the utility plates, the utility fluids. The flow rate of the process fluids was 25 l/hr and the flow rate of the utility fluids was 2000 l/hr. The temperature was measured at different times and the results are summarized in a graph shown in FIG. 25.

The flow module of the present invention is useful when undertaking the following process operations; manufacturing, reactions, mixing, blending, doing cryogenic operations, washing, extractions and purifications, pH adjustment, solvent exchanges, manufacturing of chemicals, manufacturing of intermediate chemicals, manufacturing API (active pharmaceutical ingredients) when working with low temperature operations, manufacturing of pharmaceutical intermediates, scale-up and scale-down developments, precipitation or crystallisations, performing multiple injections or multiple additions or multiple measurements or multiple samplings, working with multistep reactions, precooling operations, preheating operations, post-heating and post-cooling operations, processes for converting batch processes to continuous processes, and operations for dividing and recombining flows.

Reaction types which can be preformed in the present invention include addition reactions, substitution reactions, elimination reactions, exchange reactions, quenching reactions, reductions, neutralisations, decompositions, replacement or displacement reactions, disproportionation reactions, catalytic reactions, cleaving reactions, oxidations, ring closures and ring openings, aromatization and dearomatization reactions, protection and deprotection reactions, phase transfer and phase transfer catalysis, photochemical reactions, reactions involving gas phases, liquid phases and solid phases, and which may involve free radicals, electrophiles, neucleophiles, ions, neutral molecules, etc.

Synthesis such as amino acid synthesis, asymmetric synthesis, chiral synthesis, liquid phase peptide synthesis, olefin metathesis, peptide synthesis, etc. can also be carried out with the flow module. Other types of synthesis in which the flow module can be used are reactions within carbohydrate chemistry, carbon disulfide chemistry, cyanide chemistry, diborane chemistry, epichlorohydrin chemistry, hydrazine chemistry, nitromethane chemistry, etc. or synthesis of heterocyclic compounds, of acetylenic compounds, of acid chlorides, of catalysts, of cytotoxic compounds, of steroid intermediates, of ionic liquids, of pyridine chemicals, of polymers, of monomers, of carbohydrates, of nitrones etc.

The flow module is suitable for name reactions such as Aldol condensations, Birch reductions, Baeyer-Villiger oxidations, Curtius rearrangements, Dieckmann condensations, Diels-Alder reactions, Doebner-Knoevenagel condensations, Friedel-Crafts reactions, Fries rearrangements, Gabriel synthesis, Gomberg-Bachmann reactions, Grignard reactions, Heck reactions, Hofmann rearrangements, Japp-Klingemann reactions, Leimgruber-Batcho indole synthesis, Mannich reactions, Michael additions, Michaelis-Arbuzov reactions, Mitsunobu reactions, Miyaura-Suzuki reactions, Reformatsky reactions, Ritter reactions, Rosenmund reductions, Sandmeyer reactions, Schiff base reductions, Schotten-Baumann reactions, Sharpless epoxidations, Skraup synthesis, Sonogashira couplings, Strecker amino acid synthesis, Swern oxidations, Ullmann reactions, Willgerodt rearrangements, Vilsmeier-Haack reactions, Williamson ether synthesis, Wittig reactions etc.

Further reactions which the flow module is suitable for are condensation reactions, coupling reactions, saponifications, ozonolysis, cyclization reactions, cyclopolymerization reactions, dehalogenations, dehydrocyclizations, dehydrogenations, dehydrohalogennations, diazotizations, dimethyl sulphate reactions, halide exchanges, hydrogen cyanide reactions, hydrogen fluoride reactions, hydrogenation reactions, iodination reactions, isocyanate reactions, ketene reactions, liquid ammonia reactions, methylation reactions, coupling, organometallic reactions, metalation, oxidation reactions, oxidative couplings, oxo reactions, polycondensations, polyesterifications, polymerization reactions, other reaction such as acetylations, arylations, acrylations, alkoxylations, ammonolysis, alkylations, allylic brominations, amidations, aminations, azidations, benzoylations, brominations, butylations, carbonylations, carboxylations, chlorinations, chloromethylations, chlorosulfonations, cyanations, cyanoethylations, cyano-methy-lations, cyanurations, epoxidations, esterifications, etherifications, halogenations, hydroformylations, hydrosilylations, hydroxylations, ketalizations, nitrations, nitro-methylations, nitrosations, peroxidations, phosgenations, quaternizations, silylations, sulfochlorinations, sulfonations, sulfoxidations, thiocarbonylations, thiophosgenations, tosylations, transaminations, transesterifications, etc.

The present invention is further defined by the independent claims and the dependent claims.

What is claimed is:

1. A channel plate comprising:
   at least two rows of units;
   at least one turning box;
   at least one inlet; and
   at least one outlet,
   wherein each unit has one planar surface opposite a channel forming surface and the units are alternating in each row that a planar surface is adjacent to a channel forming surface in the same row forming a channel when the channel plate is in use,
   wherein the turning box is arranged between two adjacent rows of units forming two compartments in a space between two adjacent rows of units in the channel plate and one inner side of the channel plate, which compartments are divided by a wall to create a three dimensional flow resulting in an enhanced mixing, and that fluids may flow from a first row of units to a second row of units in the turning box, and
   wherein the planar surfaces of the units are arranged in rows perpendicular to the formed channel of the channel plate.

2. The channel plate according to claim 1, wherein the channel forming surface in the row is selected from curved convex surface, trapezoid surface, rectangular surface, square surface, triangular surface, and the rows of units have all channel forming surfaces selected from the same channel forming surface type or
   the channel forming surfaces of the rows of units are one or more combinations of curved convex surfaces, rectangular surfaces, square surfaces, and triangular surfaces, and preferably the rows of planar surfaces of the units are arranged in parallel rows perpendicular to the formed channel of the channel plate.

3. The channel plate according to claim 1, wherein the channel plate has a number of ports connected to the channel or to the turning boxes, the ports are arranged on at least one side of the channel plate, the ports are either plugged or equipped with different equipments or the ports are combinations of plugged and equipped ports, which equipment are introduced through the ports to the channel or to the empty space of the turning boxes.

4. The channel plate according to claim 1, wherein the equipped ports are equipped with one or more equipments selected from the group consisting of inlets for reactants, inlets for additional fluids, outlets for process fluids, outlets for intermediate products to be fed into the channel at a later stage, outlets for test samples, inlet dispersers, security devices for pressure release instant or controlled, sensor units, thermocouples, resistance thermometers, or nozzles selected from injection nozzles, dispersion nozzles, re-dispersion nozzles, re-mixing nozzles, coaxial nozzles, tube nozzles or combinations of equipments.

5. The channel plate according to claim 1, wherein the channel plate comprises a process flow inlet and an additional flow inlet at the inlet part of the channel plate, the process flow inlet and the additional flow inlet are combined in a straight part connecting a port and the channel of the channel plate, or the channel plate comprises a process flow inlet and an additional flow inlet which are combined outside channel of the channel plate.

6. A flow section comprising:
   at least one channel plate comprising:
     at least two rows of units;
     at least one turning box;
     at least one inlet; and
     at least one outlet,
     wherein each unit has one planar surface opposite a channel forming surface and the units are alternating in each row that a planar surface is adjacent to a channel forming surface in the same row forming a channel when the channel plate is in use,
     wherein the turning box is arranged between two adjacent rows of units forming two compartments in a space between two adjacent rows of units in the channel plate and one inner side of the channel plate, which compartments are divided by a wall to create a three dimensional flow resulting in an enhanced mixing, and that fluids may flow from a first row of units to a second row of units in the turning box,
     wherein the planar surfaces of the units are arranged in rows perpendicular to the formed channel of the channel plate;
   at least one of a barrier plate and a utility plate;
   wherein at least one of:
     a) the at least one channel plate is arranged between two of the barrier plates, which are sealing a channel formed by the at least one channel plate and the two barrier plates;
     b) the at least one channel plate is arranged between two of the utility plates, having turbulator inserts or turbulator plates, which are sealing a channel formed by the at least one channel plate and the two utility plates;
     c) the at least one channel plate is arranged between one of the barrier plates and one of the utility plates, which are sealing a channel formed by the channel plate and the barrier plates and the utility plates; and
     d) two channel plates having a membrane or a filter applied between the two channel plates; and the two channel plates are between:
       two of the barrier plates,
       two of the utility plates having turbulator inserts or turbulator plates, or
       one of the barrier plates and one of the utility plates having a turbulator insert or a turbulator plate.

7. The flow section according to claim 6, wherein the flow section also comprises gaskets having a pattern corresponding to the planar surfaces of the units of the rows of units or
   wherein the at least one turbulator insert has a pattern corresponding to the planar surfaces of the units of the rows of units, or both the gaskets and the turbulator of the utility plates have pattern corresponding to the planar surfaces of the units of the rows of units.

8. The flow section according to claim 7, wherein the flow of media or the flow of fluids in the formed channel has no contact with the gasket's planar face and little or minimized contact with any of the gaskets edges.

9. The flow section according to claim 6, wherein each turbulator insert provides a support to the planar sides of the row of units of the channel plate.

10. The flow section according to claim 6, wherein the utility plate has compartment for the channel plate and a compartment for a turbulator insert.

11. The flow section of claim 6 wherein the at least one channel plate is arranged between the first of the at least one utility plate and the second of the at least one utility plate, wherein the first of the at least one utility plate seals a first utility channel formed between the first of the at least one utility plate and the first of the at least one barrier plate and the second of the at least one utility plate seals a second utility channel formed between the second of the at least one utility plate and the a second of the at least one barrier plates.

12. The flow section of claim 11 wherein the at least one channel plate is arranged between the first of the at least one barrier plate and a second of the at least one barrier plate;
the first of the at least one barrier plate being positioned between the at least one channel plate and the first of the at least one utility plate; and
the second of the at least one barrier plate being positioned between the at least one channel plate and a second of the at least one utility plate.

13. The flow section of claim 6 wherein the flow section comprises two channel plates.

14. A flow module comprising
a) a stack of flow sections, each flow section comprising:
at least one channel plate comprising:
at least two rows of units;
at least one turning box;
at least one inlet; and
at least one outlet,
wherein each unit has one planar surface opposite a channel forming surface and the units are alternating in each row that a planar surface is adjacent to a channel forming surface in the same row forming a channel when the channel plate is in use,
wherein the turning box is arranged between two adjacent rows of units forming two compartments in a space between two adjacent rows of units in the channel plate and one inner side of the channel plate, which compartments are divided by a wall to create a three dimensional flow resulting in an enhanced mixing, and that fluids may flow from a first row of units to a second row of units in the turning box,
wherein the planar surfaces of the units are arranged in rows perpendicular to the formed channel of the channel plate;
at least one of a barrier plate and a utility plate;
wherein at least one of:
a) the at least one channel plate is arranged between two of the barrier plates, which are sealing a channel formed by the at least one channel plate and the two barrier plates;
b) the at least one channel plate is arranged between two of the utility plates, having turbulator inserts or turbulator plates, which are sealing a channel formed by the at least one channel plate and the two utility plates;
c) the at least one channel plate is arranged between one of the barrier plates and one of the utility plates, which are sealing a channel formed by the channel plate and the barrier plates and the utility plates; and
d) two channel plates having a membrane or a filter applied between the two channel plates; and the two channel plates are between:
two of the barrier plates,
two of the utility plates having turbulator inserts or turbulator plates, or
one of the barrier plates and one of the utility plates having a turbulator insert or a turbulator plate; and
b) at least one inlet for process fluids;
at least one outlet for process products, wherein one the at least one inlet is connected to the one of the channel plates and one outlet is connected to the another of the channel plates, and wherein the channel is connected parallel or is the channel connected in series, or both, the channel is connected externally or the channel is connected internally, and wherein internal and/or external conduits are connecting the utility plates and the utility plates are connected in series or parallel or both to each other.

15. The flow module according to claim 14, wherein a clamping device, is connected to the flow module, the clamping device comprises two end plates, disc springs, pistons, and tension rods,
wherein piles of disc springs are thread on the pistons and are arranged as a grid of springs, one or more grids of springs are comprised in the flow module, at least one grid of springs is supported on at least one of the endplates to distribute clamping forces on one or more flow sections or one or more channel plates, which flow sections are placed between the two end plates, and
wherein the pistons are guided through holes in the endplates having the arrangement of the grid of springs.

16. The flow module of claim 14 wherein the channel of at least one flow section is connected internally to at least one of another channel or the inlet or the outlet.

17. The flow module of claim 16 wherein at least one internal conduit is connecting the utility plates.

18. The flow module of claim 17 wherein the utility plates are connected in series to each other.

19. The flow module of claim 16 wherein the utility plates are connected in parallel to each other.

20. The flow module of claim 17 wherein the utility plates are connected to each other bye a combination of at least one serial connection and at least one parallel connection.

21. The flow module of claim 14 wherein the channel of at least one flow section is connected externally to at least one of another channel or the inlet or the outlet.

22. A method of using the flow module according to claim 14, the method comprising using the flow module as a continuous plate reactor.

* * * * *